US011556220B1

(12) United States Patent
Inch et al.

(10) Patent No.: US 11,556,220 B1
(45) Date of Patent: *Jan. 17, 2023

(54) 3D INTERACTIONS WITH WEB CONTENT

(71) Applicant: Meta Platforms Technologies, LLC, Menlo Park, CA (US)

(72) Inventors: Joshua Jacob Inch, Eastsound, WA (US); Reilly Donovan, Seattle, WA (US); Diana Min Liao, Warren, NJ (US); Justin Rogers, Clyde Hill, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,993

(22) Filed: Jul. 6, 2021

Related U.S. Application Data

(63) Continuation of application No. 16/661,945, filed on Oct. 23, 2019, now Pat. No. 11,086,476.

(51) Int. Cl.
*G06F 3/0481* (2022.01)
*G06F 3/01* (2006.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
CPC ...... G06F 3/04815; G06F 3/011; G06F 3/017; G06F 3/04845; G06F 3/04842; G06T 19/006
See application file for complete search history.

(56) References Cited

U.S. PATENT DOCUMENTS

| | | | |
|---|---|---|---|
| 6,842,175 B1* | 1/2005 | Schmalstieg | G06F 3/011 345/427 |
| 7,701,439 B2* | 4/2010 | Hillis | G06F 3/0304 382/103 |

(Continued)

OTHER PUBLICATIONS

Trademark Application Serial No. 73289805, filed Dec. 15, 1980, 1 page.

(Continued)

*Primary Examiner* — Daeho D Song
(74) *Attorney, Agent, or Firm* — Potomac Law Group, PLLC

(57) ABSTRACT

Embodiments of a 3D web interaction system are disclosed that allow a user to select a content item from a browser, displayed in an artificial reality environment, and present a corresponding version of the content item in the artificial reality environment. The 3D web interaction system can create the version of the selected content item in different ways depending on whether the selected content item is associated with 3D content and, if so, the type of the associated 3D content. For example, the 3D web interaction system can create and present different versions of the selected content item depending on whether the selected content item is (a) not associated with 3D content, (b) associated with "environment content," or (c) associated with one or more 3D models.

20 Claims, 20 Drawing Sheets

(51) Int. Cl.
*G06F 3/0484* (2022.01)
*G06T 19/00* (2011.01)
*G06F 3/04815* (2022.01)
*G06F 3/04845* (2022.01)
*G06F 3/04842* (2022.01)

(52) U.S. Cl.
CPC ........ *G06F 3/04845* (2013.01); *G06T 19/006* (2013.01); *G06F 3/04842* (2013.01); *G06F 2203/04803* (2013.01)

(56) References Cited

U.S. PATENT DOCUMENTS

| | | | | |
|---|---|---|---|---|
| D683,749 S | * | 6/2013 | Hally | D14/487 |
| D689,874 S | * | 9/2013 | Brinda | D14/485 |
| 8,947,351 B1 | * | 2/2015 | Noble | G06F 3/04883 345/156 |
| D726,219 S | * | 4/2015 | Chaudhri | D14/489 |
| D727,352 S | * | 4/2015 | Ray | D14/488 |
| D727,354 S | * | 4/2015 | Park | D14/492 |
| D733,740 S | * | 7/2015 | Lee | D14/487 |
| 9,117,274 B2 | * | 8/2015 | Liao | H04N 9/3179 |
| 9,292,089 B1 | * | 3/2016 | Sadek | G06F 3/011 |
| D761,273 S | * | 7/2016 | Kim | D14/485 |
| D763,279 S | * | 8/2016 | Jou | D14/486 |
| 9,477,368 B1 | * | 10/2016 | Filip | G01C 21/367 |
| D775,179 S | * | 12/2016 | Kimura | D14/486 |
| D775,196 S | * | 12/2016 | Huang | D14/489 |
| D780,794 S | * | 3/2017 | Kisielius | D14/491 |
| D781,905 S | * | 3/2017 | Nakaguchi | D14/487 |
| D783,037 S | * | 4/2017 | Hariharan | D14/491 |
| D784,394 S | * | 4/2017 | Laing | D14/487 |
| D784,395 S | * | 4/2017 | Laing | D14/487 |
| D787,527 S | * | 5/2017 | Wilberding | D14/485 |
| D788,136 S | * | 5/2017 | Jaini | D14/486 |
| D788,793 S | * | 6/2017 | Ogundokun | D14/485 |
| D789,416 S | * | 6/2017 | Baluja | D14/491 |
| D789,977 S | * | 6/2017 | Mijatovic | D14/488 |
| D790,567 S | * | 6/2017 | Su | D14/488 |
| D791,823 S | * | 7/2017 | Zhou | D14/490 |
| D793,403 S | * | 8/2017 | Cross | D7/406 |
| 9,817,472 B2 | * | 11/2017 | Lee | G06F 3/0346 |
| D817,994 S | * | 5/2018 | Jou | D14/487 |
| D819,065 S | * | 5/2018 | Xie | D14/486 |
| D824,951 S | * | 8/2018 | Kolbrener | D14/486 |
| D828,381 S | * | 9/2018 | Lee | D14/487 |
| D829,231 S | * | 9/2018 | Hess | D14/486 |
| D831,681 S | * | 10/2018 | Eilertsen | D14/485 |
| D835,665 S | * | 12/2018 | Kimura | D14/488 |
| 10,168,768 B1 | * | 1/2019 | Kinstner | G06F 3/04847 |
| D842,889 S | * | 3/2019 | Krainer | D14/486 |
| 10,220,303 B1 | * | 3/2019 | Schmidt | A63F 13/814 |
| 10,248,284 B2 | * | 4/2019 | Itani | G06V 40/28 |
| D848,474 S | * | 5/2019 | Baumez | D14/489 |
| D850,468 S | * | 6/2019 | Malahy | D14/485 |
| D851,123 S | * | 6/2019 | Turner | D14/489 |
| D853,431 S | * | 7/2019 | Sagrillo | D14/486 |
| D854,551 S | * | 7/2019 | Pistiner | D14/485 |
| D856,366 S | * | 8/2019 | Richardson | D14/488 |
| D859,426 S | * | 9/2019 | Poes | D14/485 |
| 10,473,935 B1 | * | 11/2019 | Gribetz | G06T 19/006 |
| 10,521,944 B2 | * | 12/2019 | Sareen | G06F 3/013 |
| 10,665,019 B2 | * | 5/2020 | Hildreth | G02B 27/0172 |
| D888,071 S | * | 6/2020 | Wilberding | D14/485 |
| D900,123 S | * | 10/2020 | Lopes | D14/485 |
| D908,713 S | * | 1/2021 | Fremine | D14/485 |
| D910,655 S | * | 2/2021 | Matthewman | D14/485 |
| D910,660 S | * | 2/2021 | Chaturvedi | D14/485 |
| 10,916,220 B2 | * | 2/2021 | Ngo | G06F 3/04842 |
| 10,987,573 B2 | * | 4/2021 | Nietfeld | G06F 3/0346 |
| 11,086,476 B2 | * | 8/2021 | Inch | G06F 3/04845 |
| 2008/0089587 A1 | * | 4/2008 | Kim | G06F 3/0304 382/190 |
| 2010/0306716 A1 | * | 12/2010 | Perez | A63F 13/428 715/863 |
| 2011/0267265 A1 | * | 11/2011 | Stinson | G06F 3/0304 345/157 |
| 2011/0302535 A1 | * | 12/2011 | Clerc | G06F 3/017 715/848 |
| 2012/0069168 A1 | * | 3/2012 | Huang | G06F 3/017 345/158 |
| 2012/0143358 A1 | * | 6/2012 | Adams | A63F 13/814 700/92 |
| 2012/0206345 A1 | * | 8/2012 | Langridge | G06F 3/04842 345/157 |
| 2012/0275686 A1 | * | 11/2012 | Wilson | G06T 17/00 382/154 |
| 2012/0293544 A1 | * | 11/2012 | Miyamoto | G06F 3/005 345/620 |
| 2013/0063345 A1 | * | 3/2013 | Maeda | G06F 3/0481 345/156 |
| 2013/0125066 A1 | * | 5/2013 | Klein | G06F 3/04812 715/862 |
| 2013/0147793 A1 | * | 6/2013 | Jeon | G06F 3/0488 345/157 |
| 2013/0265220 A1 | * | 10/2013 | Fleischmann | G06F 3/011 345/156 |
| 2014/0125598 A1 | * | 5/2014 | Cheng | G06F 3/04883 345/173 |
| 2014/0236996 A1 | * | 8/2014 | Masuko | G06F 3/048 707/776 |
| 2015/0035746 A1 | * | 2/2015 | Cockburn | G06F 3/011 345/156 |
| 2015/0054742 A1 | * | 2/2015 | Imoto | G06F 3/038 345/158 |
| 2015/0062160 A1 | * | 3/2015 | Sakamoto | G06F 3/04815 345/633 |
| 2015/0153833 A1 | * | 6/2015 | Pinault | G06V 40/113 345/156 |
| 2015/0160736 A1 | * | 6/2015 | Fujiwara | G06F 3/147 345/156 |
| 2015/0169076 A1 | * | 6/2015 | Cohen | G06T 15/20 345/156 |
| 2015/0181679 A1 | * | 6/2015 | Liao | H05B 47/125 315/291 |
| 2015/0206321 A1 | * | 7/2015 | Scavezze | G06F 3/0485 345/633 |
| 2015/0220150 A1 | * | 8/2015 | Plagemann | G06F 3/017 715/856 |
| 2015/0261659 A1 | * | 9/2015 | Bader | G06F 3/017 717/125 |
| 2015/0293666 A1 | * | 10/2015 | Lee | G06F 3/04815 715/849 |
| 2015/0371441 A1 | * | 12/2015 | Shim | G06T 15/005 345/420 |
| 2016/0062618 A1 | * | 3/2016 | Fagan | G06F 3/0488 715/772 |
| 2016/0110052 A1 | * | 4/2016 | Kim | G06F 3/04883 345/173 |
| 2016/0147308 A1 | * | 5/2016 | Gelman | G06F 3/013 345/156 |
| 2016/0378291 A1 | * | 12/2016 | Pokrzywka | G06F 3/0488 715/751 |
| 2017/0031503 A1 | * | 2/2017 | Rosenberg | G06F 3/04842 |
| 2017/0060230 A1 | * | 3/2017 | Faaborg | G06F 3/04883 |
| 2017/0109936 A1 | * | 4/2017 | Powderly | G06F 3/0482 |
| 2017/0139478 A1 | * | 5/2017 | Jeon | G06F 3/017 |
| 2017/0192513 A1 | * | 7/2017 | Karmon | G06V 40/28 |
| 2017/0236320 A1 | * | 8/2017 | Gribetz | G06F 3/011 345/419 |
| 2017/0237789 A1 | * | 8/2017 | Harner | H04L 65/4015 709/205 |
| 2017/0262063 A1 | * | 9/2017 | Blénessy | G06F 3/011 |
| 2017/0278304 A1 | * | 9/2017 | Hildreth | G06F 3/04815 |
| 2017/0287225 A1 | * | 10/2017 | Powderly | G06F 3/017 |
| 2017/0296363 A1 | * | 10/2017 | Yetkin | G06F 3/015 |
| 2017/0316606 A1 | * | 11/2017 | Khalid | G06T 17/00 |
| 2017/0336951 A1 | * | 11/2017 | Palmaro | G06T 19/20 |
| 2017/0364198 A1 | * | 12/2017 | Yoganandan | G06F 3/0488 |
| 2018/0059901 A1 | * | 3/2018 | Gullicksen | G06T 19/003 |
| 2018/0107278 A1 | * | 4/2018 | Goel | G10H 1/0008 |

(56) References Cited

U.S. PATENT DOCUMENTS

| | | | |
|---|---|---|---|
| 2018/0113599 A1* | 4/2018 | Yin | G06F 3/04842 |
| 2018/0144556 A1* | 5/2018 | Champion | H04N 13/275 |
| 2018/0307303 A1* | 10/2018 | Powderly | G02B 27/0172 |
| 2018/0322701 A1* | 11/2018 | Pahud | G06F 3/017 |
| 2018/0335925 A1* | 11/2018 | Hsiao | G06F 3/017 |
| 2018/0349690 A1* | 12/2018 | Rhee | G06F 3/04815 |
| 2019/0065027 A1* | 2/2019 | Hauenstein | G06F 3/0484 |
| 2019/0094981 A1* | 3/2019 | Bradski | G06F 3/017 |
| 2019/0107894 A1* | 4/2019 | Hebbalaguppe | G06K 9/6256 |
| 2019/0213792 A1* | 7/2019 | Jakubzak | G06F 3/017 |
| 2019/0258318 A1* | 8/2019 | Qin | G06F 3/01 |
| 2019/0278376 A1* | 9/2019 | Kutliroff | G06F 3/04845 |
| 2019/0279424 A1* | 9/2019 | Clausen | G06T 19/003 |
| 2019/0286231 A1* | 9/2019 | Burns | H04N 9/31 |
| 2019/0310757 A1* | 10/2019 | Lee | G06F 3/011 |
| 2019/0362562 A1* | 11/2019 | Benson | G06V 10/82 |
| 2019/0377416 A1* | 12/2019 | Alexander | G06F 3/04842 |
| 2019/0385372 A1* | 12/2019 | Cartwright | G06T 19/003 |
| 2020/0050289 A1* | 2/2020 | Hardie-Bick | G06F 3/0346 |
| 2020/0051527 A1* | 2/2020 | Ngo | H04N 21/42204 |
| 2020/0097077 A1* | 3/2020 | Nguyen | G06F 3/04842 |
| 2020/0097091 A1* | 3/2020 | Chou | G06V 40/28 |
| 2020/0111260 A1* | 4/2020 | Osborn | A61B 5/4519 |
| 2020/0225736 A1* | 7/2020 | Schwarz | G06F 3/0346 |
| 2020/0225758 A1* | 7/2020 | Tang | G06F 3/011 |
| 2020/0226814 A1* | 7/2020 | Tang | G06F 3/04815 |
| 2021/0011556 A1* | 1/2021 | Atlas | G06F 3/0425 |
| 2021/0090333 A1* | 3/2021 | Ravasz | G02B 27/01 |
| 2021/0124475 A1* | 4/2021 | Inch | G06F 3/017 |
| 2021/0168324 A1* | 6/2021 | Ngo | G06F 3/1423 |

OTHER PUBLICATIONS

Trademark Application Serial No. 73560027, filed Sep. 25, 1985, 1 page.

Trademark Application Serial No. 74155000, filed Apr. 8, 1991, 1 page.

Trademark Application Serial No. 76036844, filed Apr. 28, 2000, 1 page.

International Search Report and Written Opinion for International Application No. PCT/US2020/052976, dated Dec. 11, 2020, 10 Pages.

"Unity Gets Toolkit for Common AR/VR Interactions" [accessed Apr. 7, 2020]. Unity XR Interaction Toolkit Preview Dec. 19, 2019.

Hincapie-Ramos, J.D. et al. "GyroWand: IMU-based raycasting for augmented reality head-mounted displays" Proceedings of the 3rd ACM Symposium on Spatial User Interaction, Aug. 2015, pp. 89-98.

Mayer, The effect of the offset correction and cursor on mid-air pointing in real and virtual environments, Proceedings of the 2018 CHI Conference on Human Factor in Computing Systems, Apr. 2018, pp. 1-13.

Neil Katz, Extending Web Browsers with a Unity 3D-Based Virtual Worlds Viewer, 2011, IEEE Computer Society, pp. 15-21 (Year: 2011).

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Ramanujam R Srinivasa, Augmented Reality Adaptive Web Content, 2016, IEEE Annual Consumer Communications & Networking Conference (CCNC) 2016, pp. 1-4 (Year: 2016).

Renner, P. et al. "Ray Casting", [accessed Apr. 7, 2020], 2 pages.

Schweigert, R. et al. "EyePointing: A gaze-based selection technique." Proceedings of Mensch and Computer, Sep. 8, 2019, pp. 719-723.

Xiuquan Qiao, Web AR: A Promising Future for Mobile Augmented Reality—State of the Art, Challenges, and Insights, Apr. 2019, vol. 107 No. 4 IEEE, pp. 651-666 (Year: 2019).

International Preliminary Report on Patentability for International Application No. PCT/US2020/052976, dated May 5, 2022, 9 pages.

International Search Report and Written Opinion for International Application No. PCT/US2021/064674, dated Apr. 19, 2022, 13 pages.

Whitton M., et al., "Integrating Real and Virtual Objects in Virtual Environments," Aug. 24, 2007, Retrieved from http://web.archive.org/web/20070824035829/http://www.cs.unc.edu/~whitton/ExtendedCV/Papers/2005-HCII-Whitton-MIxedEnvs.pdf, on May. 3, 2017, 10 pages.

* cited by examiner

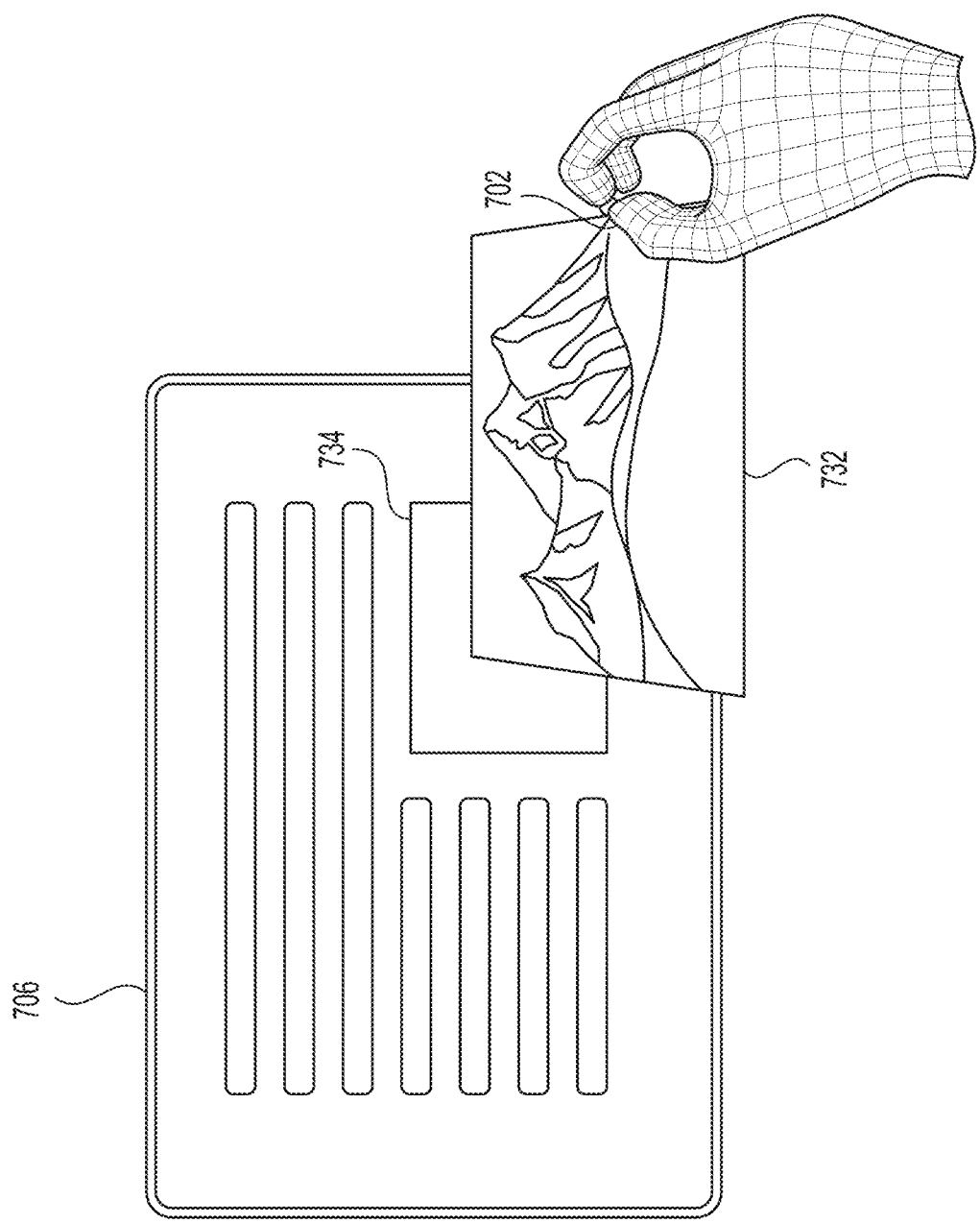

3D INTERACTIONS WITH WEB CONTENT

CROSS-REFERENCE TO RELATED APPLICATIONS

This application is a continuation of U.S. application Ser. No. 16/661,945, filed Oct. 23, 2019, titled "3D INTERACTIONS WITH WEB CONTENT," now pending, which is herein incorporated by reference in their entirety.

TECHNICAL FIELD

The present disclosure is directed to interactions in an artificial reality environment.

BACKGROUND

Various objects in an artificial reality environment are "virtual objects," i.e., representations of objects generated by a computing system that appear in the environment. Virtual objects in an artificial reality environment can be presented to a user by a head-mounted display, a mobile device, a projection system, or another computing system. Some artificial reality environments can present a virtual website browser (referred to herein as a "browser") that allows the user to view and interact with traditional websites while in the artificial reality environment. For example, a browser can be presented in the artificial reality environment as a tablet or 2D window with traditional web browser controls such as a URL bar, forward and back buttons, bookmarks, etc.

BRIEF DESCRIPTION OF THE DRAWINGS

FIGS. 7A-7C are conceptual diagrams illustrating an example interaction with a web-based content item that is not associated with 3D content.

The techniques introduced here may be better understood by referring to the following Detailed Description in conjunction with the accompanying drawings, in which like reference numerals indicate identical or functionally similar elements.

DETAILED DESCRIPTION

Figure 1:
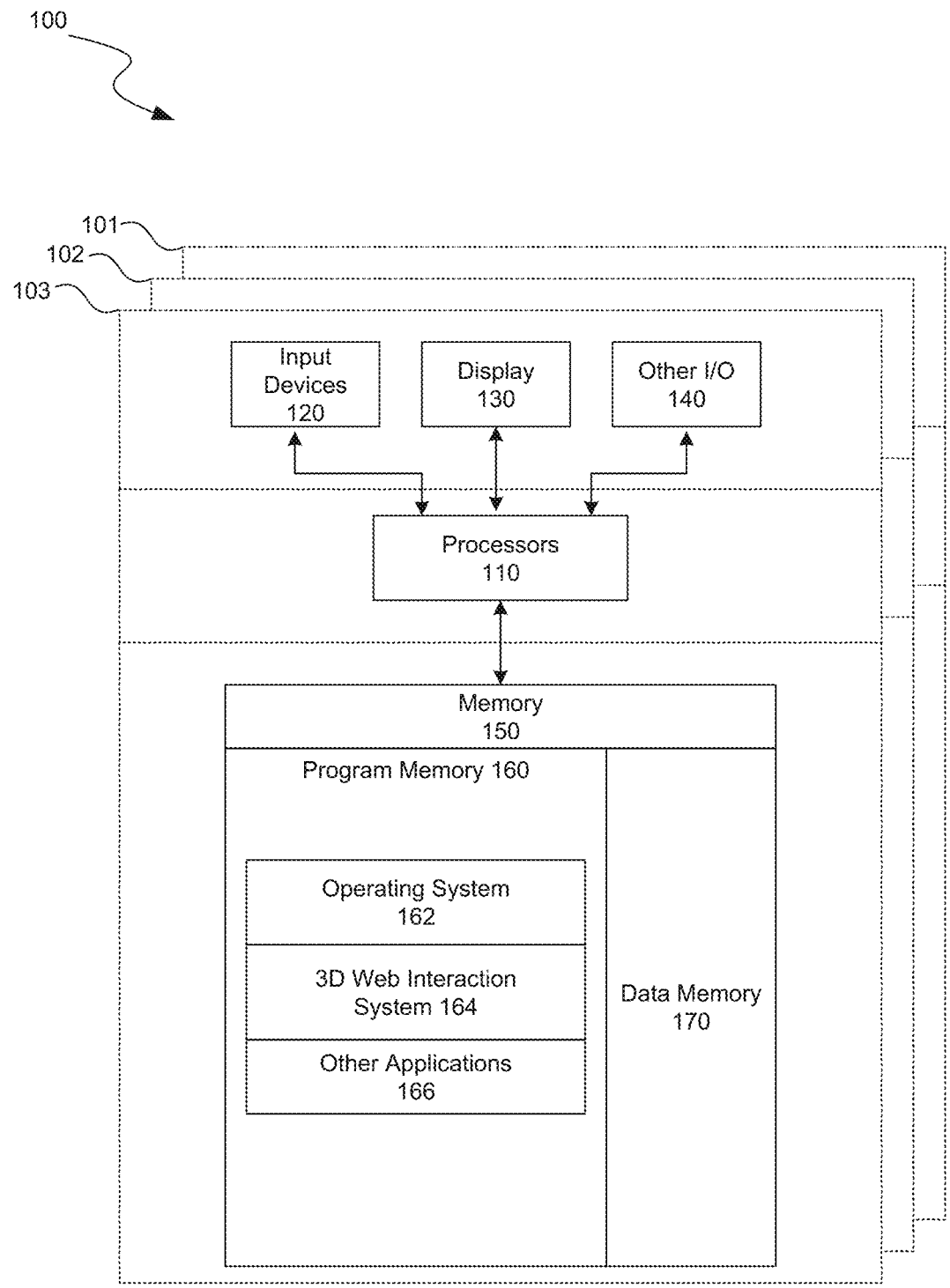
FIG. 1 is a block diagram illustrating an overview of devices on which some implementations of the present technology can operate.

Embodiments of a 3D web interaction system are disclosed that allow a user to select a content item from a browser, displayed in an artificial reality environment, and present a corresponding interactive version of the content item in the artificial reality environment outside the browser. The 3D web interaction system can create the interactive version of the selected content item in different ways depending on whether the selected content item is associated with 3D content and, if so, the type of the associated 3D content. For example, the 3D web interaction system can create and present different interactive versions of the selected content item depending on whether the selected content item is A) not associated with 3D content, B) associated with "environment content," or C) associated with one or more 3D models. "Environment content," as used herein, refers to content that can be presented by an artificial reality system as at least partially immersive. For example, 3D images, panoramic images or videos, and an artificial reality environment (e.g., a 3D "world") are all environment content as they can be displayed by an artificial reality system allowing a user to experience different parts of the content and change viewpoints as the user's perspective changes.

In operation, the 3D web interaction system can allow a user, when viewing a webpage, to select (e.g., with a "grab" gesture) displayed images or other content items and, depending on associated content can interact with it in several ways. If the selected content is a flat image with no other associated 3D content, the 3D web interaction system can present a two-dimensional version of the selected image outside of the browser, allowing the user to experience "pulling" the image out of the browser. Outside the browser, the user can look at the image, resize it, rotate it in the VR space, etc. When the user releases the two-dimensional version of the selected image, returns it to the browser, or otherwise closes out of it, the image can snap back into its original location in the webpage.

If the selected content is associated with a 3D model, the 3D web interaction system can retrieve the 3D model and present it, allowing the user to experience pulling the 3D object out of the webpage. The 3D web interaction system then provides the user with all the available options for interacting with the model, such as moving, rotating, resizing, activating controls, etc. When the user releases the 3D model, returns it to the browser, or otherwise closes out of it, the 3D model can snap into the browser, reappearing as the original content at its original location in the webpage.

If the selected content item is, or is associated with, environment content, the 3D web interaction system can retrieve the environment content and present it, allowing the user to experience pulling a partial view into the environment out of the webpage. The partial view can be a flat or curved surface showing an image of the environment. In some implementations, the flat or curved surface can be a still image of a view into the environment. In other implementations, the surface can act as a "window" allowing the user to see different views into the environment as she moves or resizes the window. The 3D web interaction system can allow the user to manipulate the partial view, e.g., to change its shape, size, and orientation in relation to the user.

As the user manipulates the partial view to take up more of her field of view, e.g., by making the partial view larger or bringing it closer to her face, the partial view can begin to encompass the artificial reality environment. When the amount of the user's field of view taken up by the partial view passes a threshold (e.g., when the partial view exceeds a threshold size and/or is within a threshold distance of the user's face) the artificial reality environment can be replaced by the environment associated with the partial view. If the environment is a panoramic image or video, the user can look around and see different viewpoints of the environment in three degrees of freedom. If the environment is a 3D image or a full other environment, the user can move and look around to see different viewpoints of the environment in six degrees of freedom.

In some implementations, the user can perform a gesture or select a control to exit the new environment and return to the original one. In some implementations, returning to the original artificial reality environment can cause the partial view to return into the browser to its original location in the webpage. In other implementations, returning to the original artificial reality environment can re-show the partial view as a surface the user can continue to manipulate. When the user releases the partial view, returns it to the browser, or otherwise closes out of it, the partial view can snap back into its original location in the webpage.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some existing XR systems include browsers (e.g., 2D panels in an artificial reality environment) for viewing and interacting with web content. However, these XR systems provide limited functionality—simply mimicking the traditional user experience of looking at a screen to browse the internet. User interactions with these browsers require interpreting expressive input in three dimensions into simple point-and-click input, severely limiting a user's ability to fully interact with web content. Even if the web content were associated with 3D content (e.g., when the web content is a panoramic image), existing XR systems only allow interactions in the flat panel browser. The 3D web interaction system and processes described herein overcome these problems associated with conventional XR interaction techniques and are expected to provide users with greater control over interactions with web content, offer more functionality, and be more natural and intuitive than interactions in existing XR systems. Despite being natural and intuitive, the 3D web interaction system and processes described herein are rooted in computerized artificial reality systems, instead of being an analog of traditional web interactions. For example, existing interactions with web content in traditional browsers or even with browsers in 3D environments fail to include ways to extract content from the browser interface into 3D space, much less provide for technical linking between web content and 3D content, on-demand retrieval of such content, and interactions with that content outside the browser. For example, existing systems do not allow a user to pull a 3D model or a partial view of a new environment out of a browser, and pull themselves inside it, replacing a current artificial reality environment with the new one. Furthermore, existing XR systems do not provide methods for interacting with web content, in a 3D environment outside a browser, that has not been linked with 3D content by either automatically converting it to 3D content or providing a 2D representation that can be manipulated outside the browser.

Several implementations are discussed below in more detail in reference to the figures. FIG. 1 is a block diagram illustrating an overview of devices on which some implementations of the disclosed technology can operate. The devices can comprise hardware components of a computing system 100 that allows a user to pull content out of a browser, displayed in a virtual environment, and manipulate the content in 3D space outside the browser. For example, such manipulations can include moving, resizing, or contorting images; looking through a window into another environment or even entering it to replace the current environment; or viewing and manipulating 3D objects; all the while allowing the user to return the content to the browser on demand and continue their web browsing experience. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, 3D web interaction system 164, and other application programs 166. Memory 150 can also include data memory 170 that can include, e.g., browser content (with tags or other links to 3D content), retrieved 3D content, conversions of 2D images to 3D images, gesture identifiers, environment data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
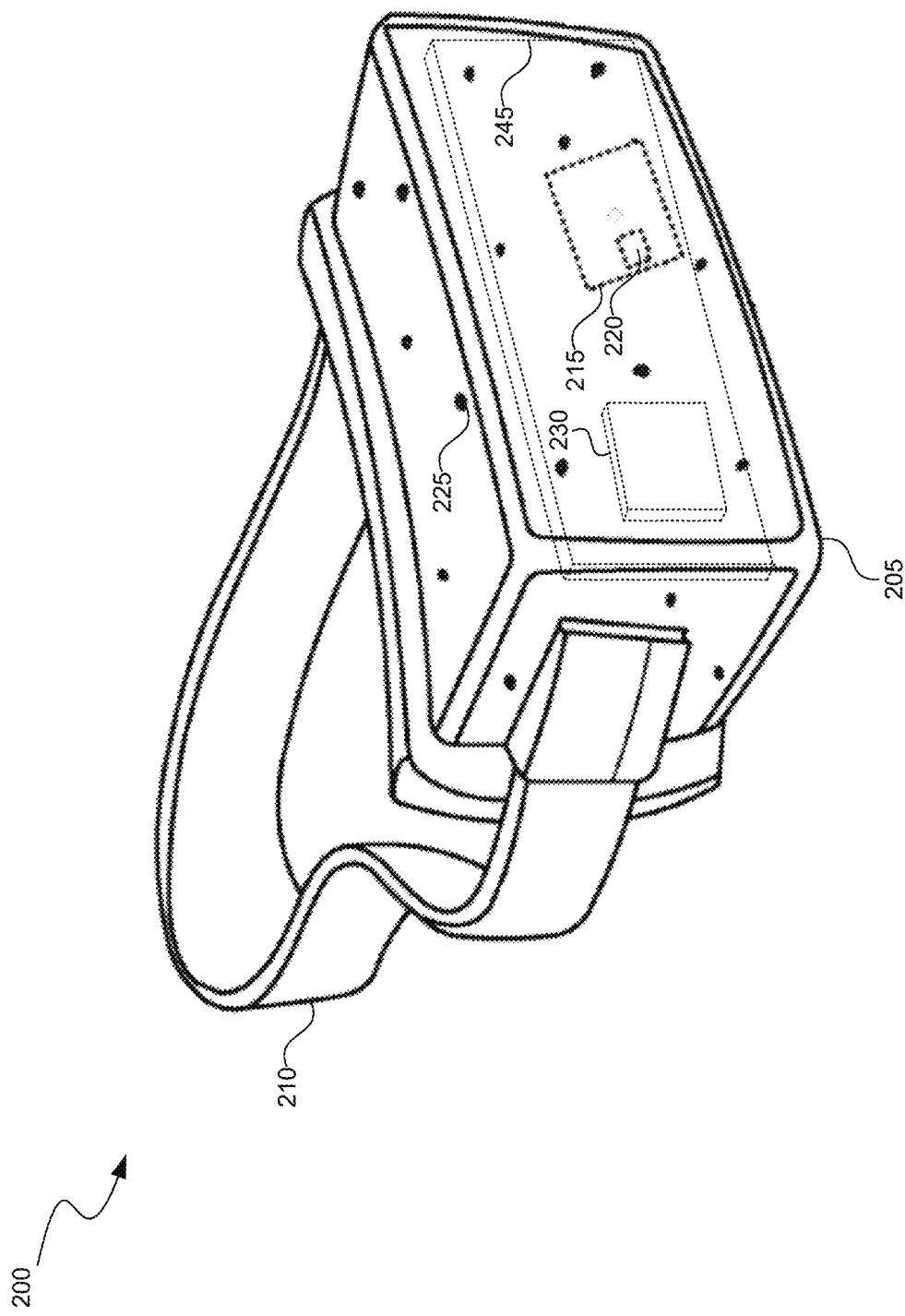
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
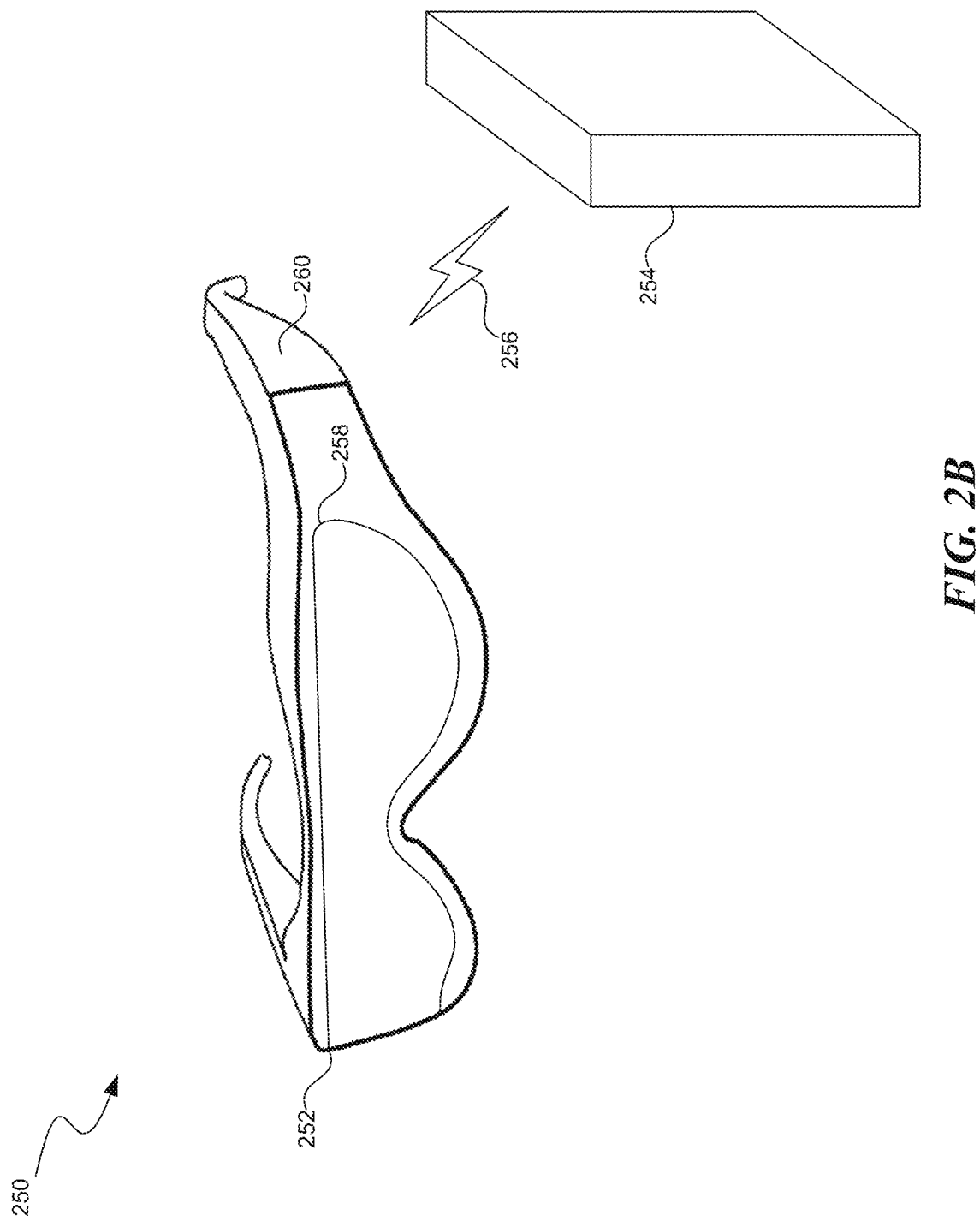
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, L3D web interaction system, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
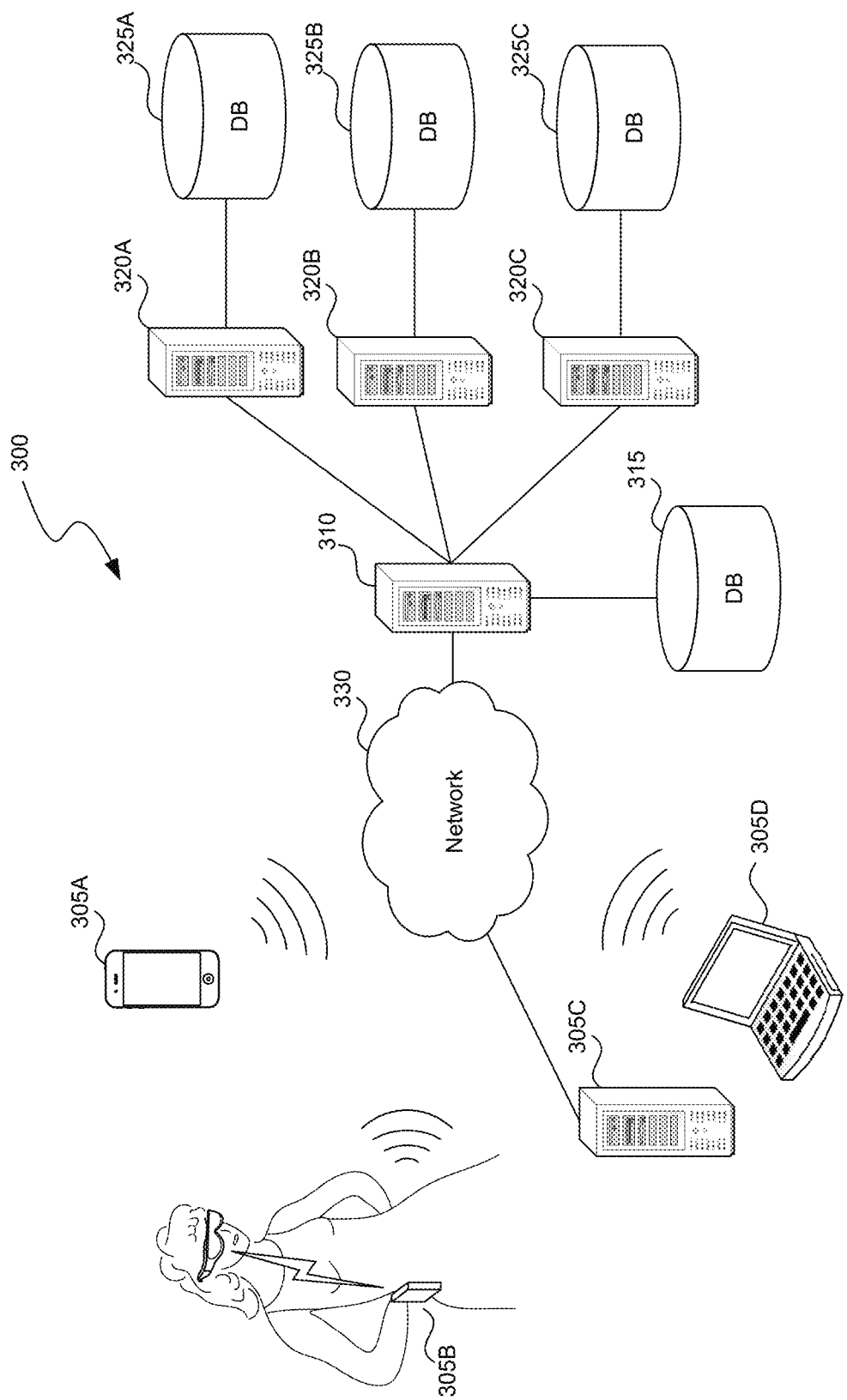
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
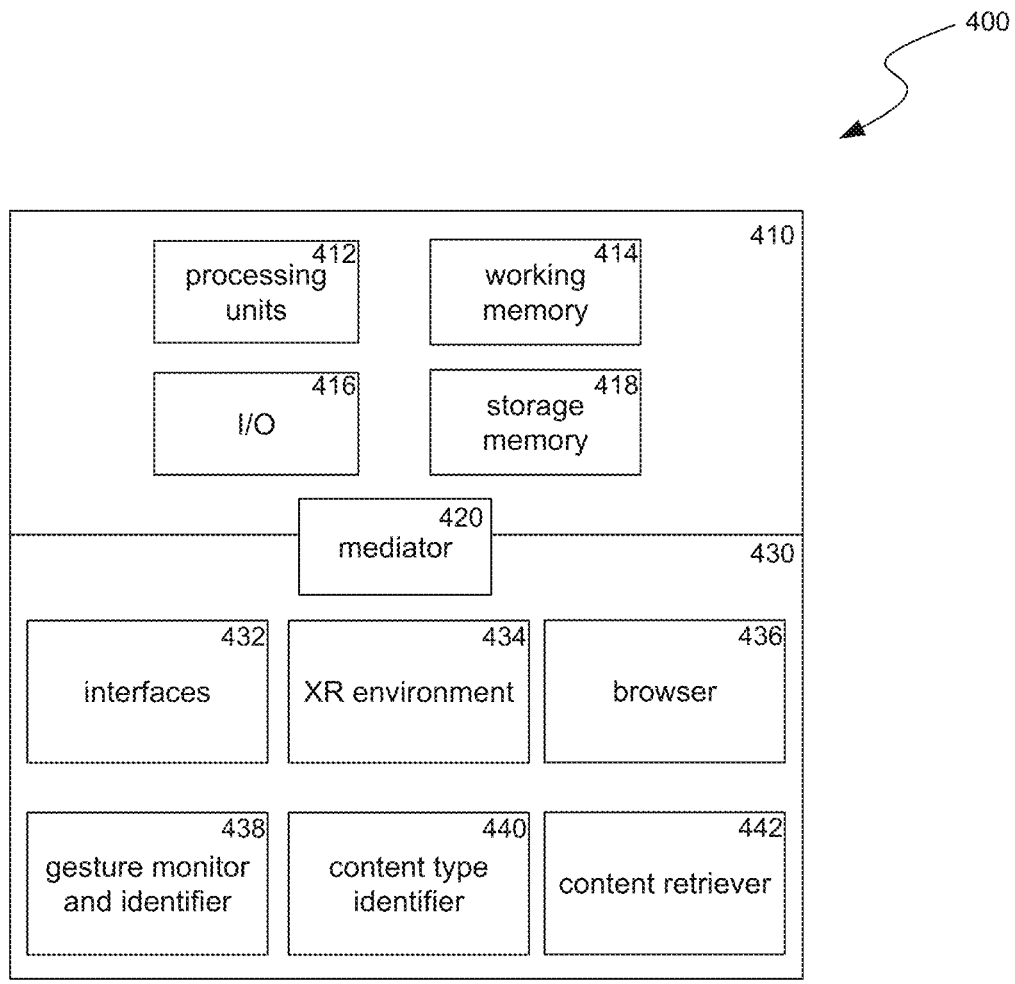
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for presenting content, associated with web content, outside a browser in an artificial reality environment. Specialized components 430 can include an XR environment 434, a browser 436, a gesture monitor and identifier 438, a content type identifier 440, a content retriever 442, and components and APIs which can be used for providing user interfaces, transferring data, and controlling the specialized components, such as interfaces 432. For example, interfaces 432 can include an inter-process communication (IPC) system which allows communication between threads across process boundaries, e.g., between "clients" and "services," with messengers interacting with thread handlers and setting up callbacks to implement communication. In some implementations, components 400 can be in a computing system that is distributed across multiple computing devices or can be an interface to a server-based application executing one or more of specialized components 430.

XR environment 434 can be any type of artificial reality environment that can display a browser and other 2D or 3D objects. In some implementations, the XR environment can include a "home" environment that presents a launcher or other menus, from which the user can launch applications such as browser 436. The XR environment 434 can also include services and other applications such as gesture monitor and identifier 438, content type identifier 440, and content retriever 442. In some implementations, these other components can be separate from the XR environment 434 or some can be part of the browser 436.

Browser 436 can be a web browser implemented in the XR environment 434. In various implementations, browser 436 can be one or more virtual panels or objects that display web content. For example, browser 436 can be a process that interprets HTML, CSS, JavaScript, and other code and markup languages into renderable content and actions between objects and/or the user. In some implementations, the browser 436 can create web pages using a document object model (DOM) where rendered content and scripts are created as a hierarchy of elements. In some cases, some data objects used by the browser 436 can exist outside the DOM. The browser 436 can receive content, which can include tags specifying the type of content (e.g., specifying whether it is 3D content or whether it is associated with 3D content with an address or path to the 3D content). The browser 436 can have code (e.g., native code, a plugin, a loaded script, or other instructions) that cause the browser 436 to send content identifiers and content positions within the browser 436 to the XR environment 434, gesture monitor and identifier 438, content type identifier 440, and/or content retriever 442. In some implementations, this code can also make modifications to the DOM, e.g., to display special UI elements or effects on elements that are associated with 3D content (thus indicating to the user they can be selected or "pulled out" of the browser into the artificial reality environment). In some implementations, this code can also respond to messages from any of the other components, e.g. to hide or replace indicated elements when they are pulled out of the browser and show the original elements when they are closed or put back into the browser.

Gesture monitor and identifier 438 can monitor a user's hands and/or controller actions (e.g., based on camera input, IMU/position sensors, etc.) and determine if they match a gesture corresponding to selecting content displayed in the browser 436 or manipulating an object, in the XR environment 434, that corresponds to a web-based content item. The gesture monitor and identifier 438 can work in conjunction with the browser 436, via interfaces 432, to identify which browser content item a gesture indicates. Thus, when a user makes a gesture to "pull" a content item out of the browser 436, these components can signal the content retriever 442 to supply the corresponding content to the XR environment 434, formatted according to a content type identified by content type identifier 440.

Content type identifier 440 can identify whether content is, or is associated with, environment content, one or more 3D models, or no 3D content. In some implementations, content type identifier 440 can accomplish this by looking at tags or other identifiers on the content being classified or on web-based content associated with the content being classified. In other implementations, content type identifier 440 can accomplish this by analyzing the encoding, structure, or other features of the content itself, or by supplying the content to a machine learning model trained to identify content types. The type identified by content type identifier 440 can control how the XR environment 434 displays content provided to it by the content retriever 442. For example, where the content type is a flat image, it can be displayed as a 2D panel or converted into a 3D image; where the content type is environment content, it can be displayed first as a partial view into the environment and then as the whole environment if the partial view exceeds a threshold (e.g., size, field of view taken, minimum distance to user); or where the content type is a 3D model, the 3D model can be displayed.

Content retriever 442 can receive an identification of one or more pieces of content (e.g., from the browser 436 upon loading a website or upon user selection of a content item) and can retrieve it from local storage or a remote location. For example, the identifier can be associated with a pointer in local memory, a path, or a remote address from which content retriever 442 can obtain the indicated content item(s).

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
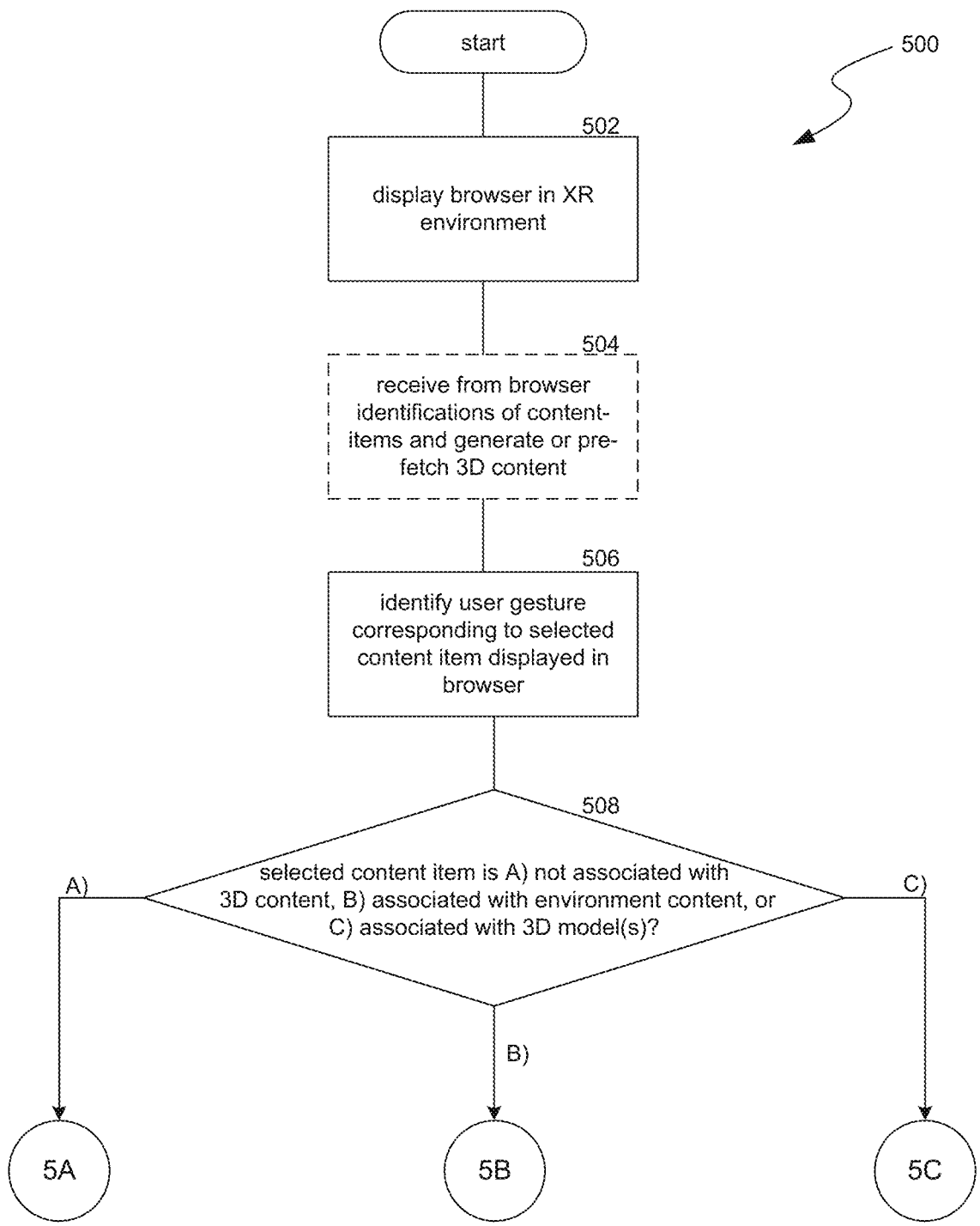
FIG. 5 (including FIG. 5, FIG. 5 continued-1, FIG. 5 continued-2, and FIG. 5 continued-3) is a flow diagram illustrating a process used in some implementations of the present technology for presenting, in an artificial reality environment, a version of a web-based content item.
Figure 5:
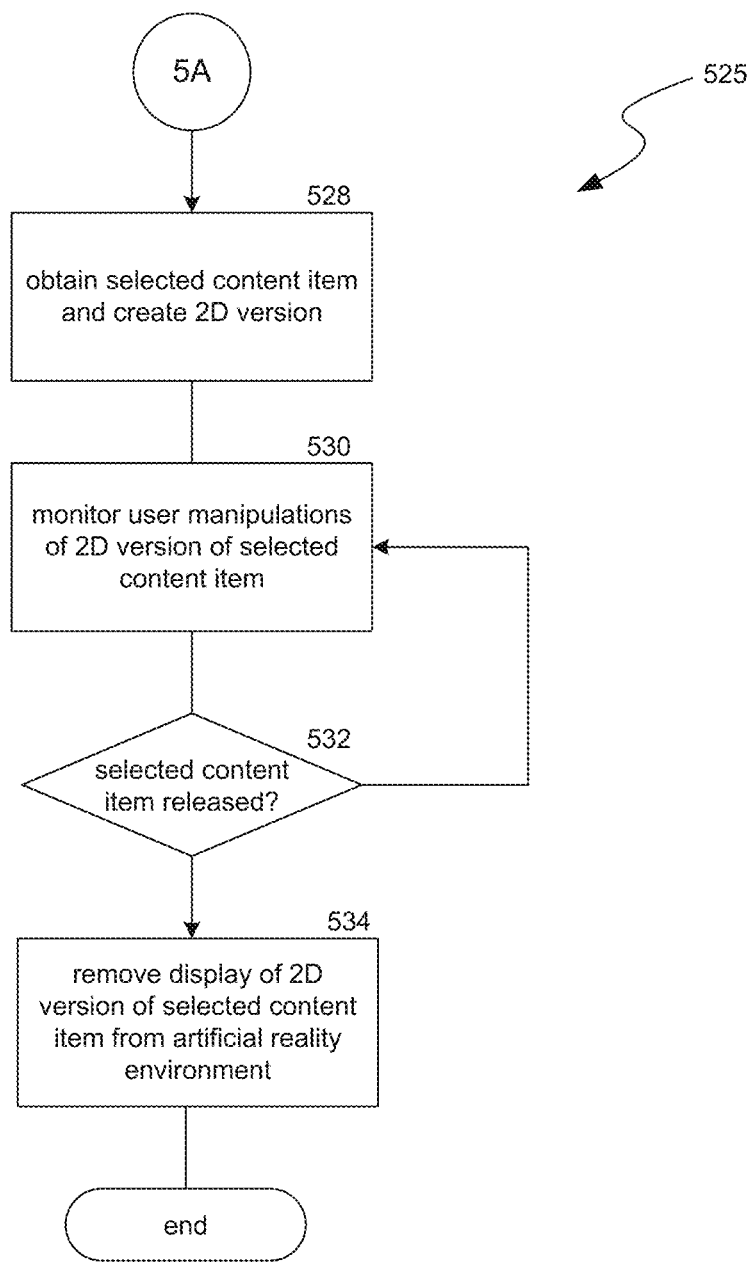
Figure 5:
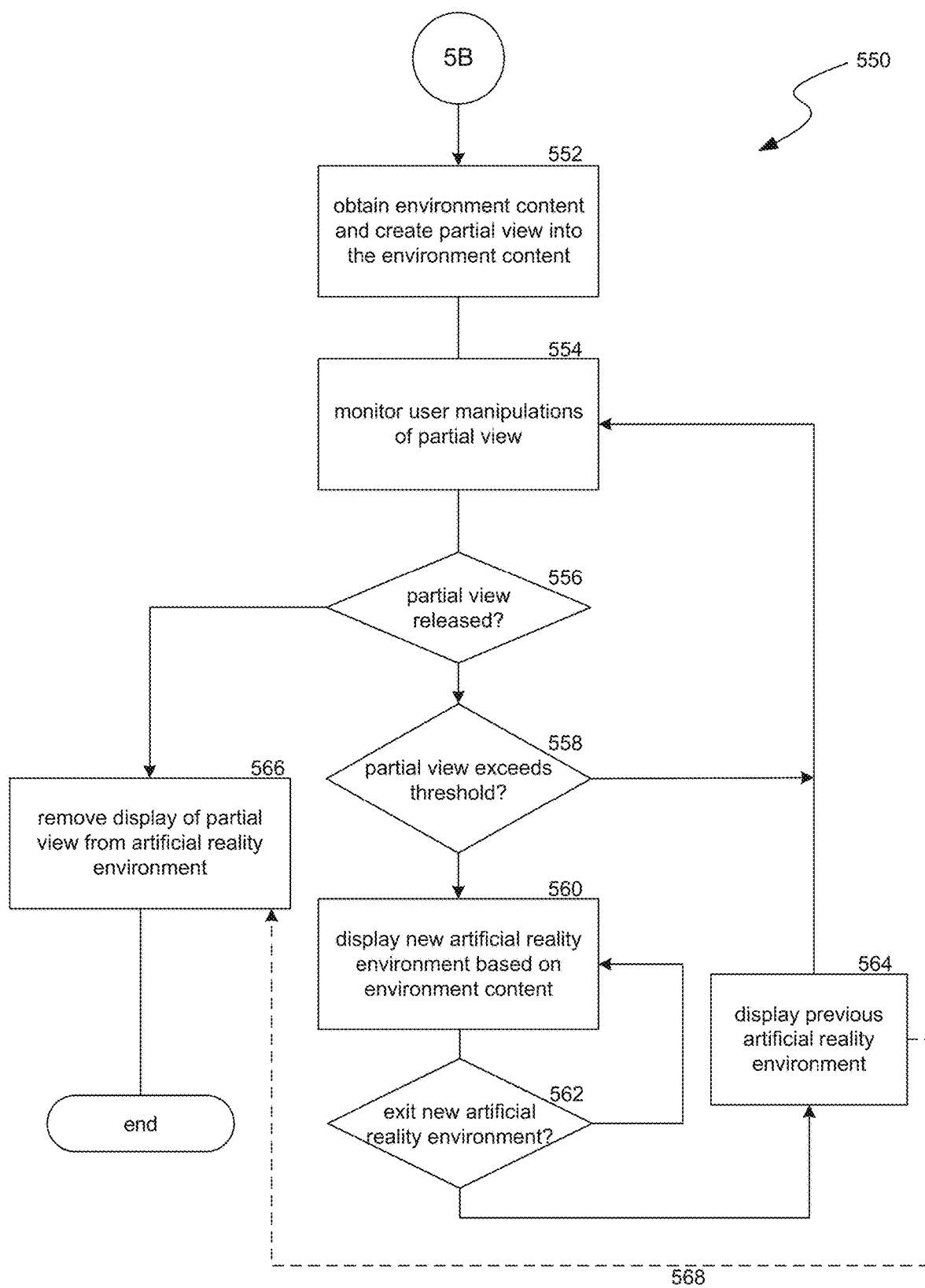
Figure 5:
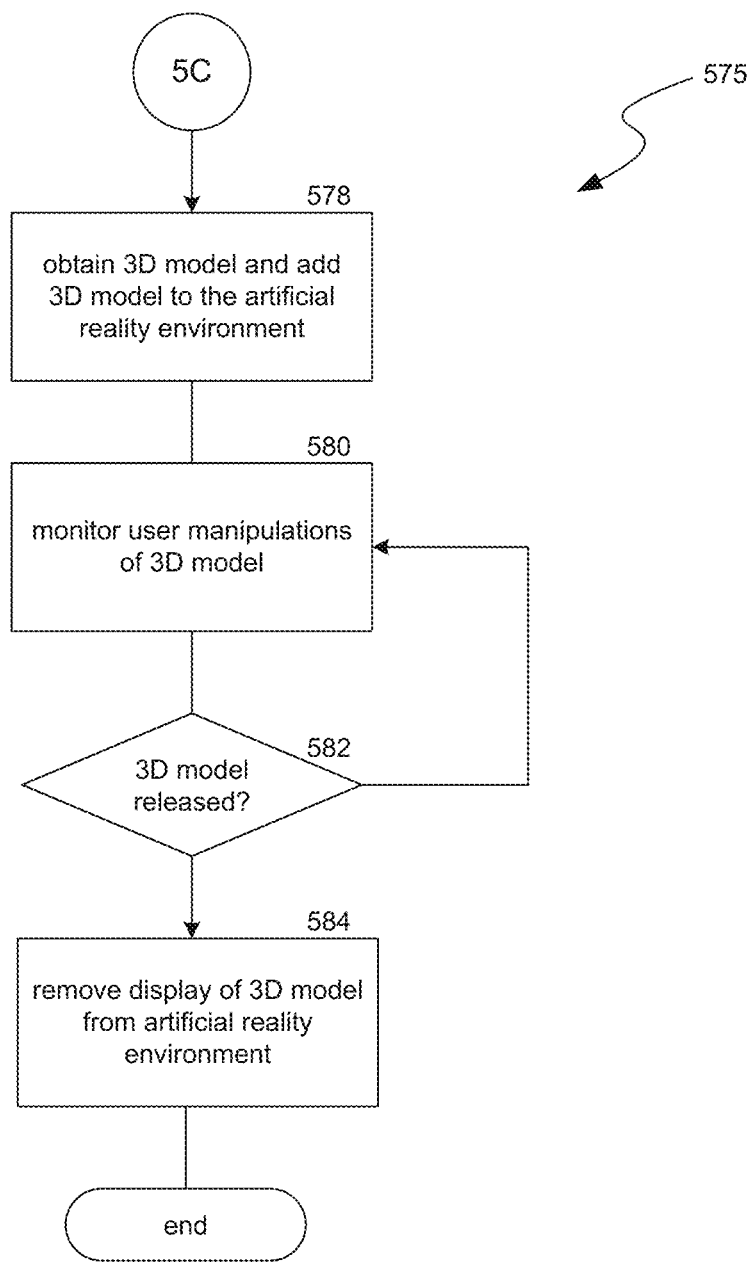

FIG. 5 (including FIG. 5, FIG. 5 continued-1, FIG. 5 continued-2, and FIG. 5 continued-3) is a flow diagram illustrating a process, with parts of the process labeled as 500, 525, 550, and 575, used in some implementations of the present technology for presenting a web-based content item in an artificial reality environment. In some implementations, process 500 can be performed as a user operates a browser in an artificial reality environment. In some implementations, parts of process 500 can be performed ahead of time e.g., by locally caching 3D content associated with web content from previous visits to a website or predictions of a user's visit to a website.

Beginning at block 502, process 500 can display a browser in an artificial reality environment. For example, a browser can be one or more 2D panels that present websites and include controls and interfaces such as a URL bar, navigation buttons, bookmarks, menus, and other traditional web browser interfaces. A user can interact with the browser in the artificial reality environment with various gestures and voice commands, such as using a finger to "hover" or "click" on displayed links or other controls, "drag" to scroll on the website, type using a real or virtual keyboard, etc.

When a user visits a website, various content items can be displayed such as text, images, videos, etc. In some cases, the content items in a website can be 3D content items, such as a 3D image or video (e.g., an image or video where changing the viewing angle changes the perspective of various objects shown in the image or video) or a panoramic image or video (e.g., an image or video where the image or current video frame is contoured into a 3D shape, such as an ellipsoid or cylinder, with a user's viewpoint set at the center of the 3D shape which the user can rotate to view different parts of the image or video frame). In some implementations, content items in a webpage can be associated with 3D content that is not displayed in the browser. Such content items can be shown for example, as a still image of the 3D content. In various implementations, the associated 3D content can be one of various types, such as environment content (e.g., a panoramic image, a panoramic video, a 3D image, or an artificial reality environment) or a 3D model.

In some implementations, when a content item in a webpage is associated with 3D content, an indicator can be presented with the content. In some implementations, the indicator can be a user interface (UI) element, such as a graphic, color, animation, shading, etc., displayed in association with the web-based content item. In other implementations, the indicator can be an effect added to the web-based content item, such as a shading or shadow effect, when the user selects, hovers on, or directs her gaze at the web-based content item associated with 3D content.

At block 504, process 500 can receive, from the browser, an identification of one or more content items included in a current website displayed in the browser. This and other communications described below, e.g., between the artificial reality environment and the browser, can be performed using inter-process communications (IPCs) messages. Block 504 is shown in dotted lines, indicating that, in some implementations, this step is skipped. In some implementations, a plug-in, native code, or a loaded script can review the content of the current website and identify certain types of content items, e.g., based on HTML tags, content post-fix identifiers, identifiers imbedded in the content items, an analysis of the content itself, or using other tags. For example, a <meta> tag can be included in a HTML header to indicate a 3D environment or 3D audio soundscape; a <link> tag can specify a 3D favicon, or additional attributes can be included in elements (e.g., a "data-model='<model_Id>'" attribute or an "data-environment='<environment_Id>'" attribute can be included in various elements such as an <img> element or <video> element or a "mediaType='<typeID>'" attribute can be included in a <srcset> element).

When identifiers for content items are received, they can be prefetched into the artificial reality environment (but not yet displayed) from local storage if available (e.g., cached) or from a remote data store, e.g., based on a URL or other location information included with the identifier. Having these content items in local storage for the artificial reality environment can reduce delays that retrieving the 3D content items could cause if they are only retrieved upon user selection.

In some implementations, images or other content items in a webpage that are not associated with 3D content can be automatically converted to panoramic or 3D images when a user visits the webpage. In some implementations, this conversion is accomplished using a machine learning method, such as the ones described in U.S. patent application Ser. No. 15/956,177, titled "Image Object Extraction and In-Painting Hidden Surfaces for Modified Viewpoint Rendering," which is incorporated herein by reference in its entirety. Process 500 can store these generated 3D content items in the local storage for the artificial reality environment and can associate them with the corresponding web content items from which they were created. In some implementations, the conversion can be performed in response to a user selecting a content item (see block 506), e.g., with a particular gesture, such as a gesture to grab and pull an image out of the browser.

At block 506, process 500 can identify a user gesture corresponding to a selected content item which is displayed in the browser. In some implementations the gesture can be made using a controller. In other implementations the gesture can be made with the user's hands, e.g., where the system uses cameras and/or wearable devices to track the location and posture of a user's hands. In some implementations, the gesture can be made with one or two hands or controllers reaching into the browser and "grabbing" a part of the content item. In various implementations, a "grab" gesture can be pressing a particular button on a controller when the controller is proximate to the content item, bringing a thumb and one or more fingers together, or making a closed hand or fist. While a grab gesture is used in examples herein, in each case, other gestures can also be used such as a finger tap, a pinch, a point, etc. In one example, a user can select a content item by grabbing one or more corners or edges of the content item. In some implementations, the gesture can include a pull as well, e.g., where the user grabs a part of the content item and pulls it away from the browser. This can provide the experience of pulling the content item out of the webpage.

In some implementations, the browser can provide indications of displayed content item locations to the artificial reality environment, allowing the artificial reality environment to determine which content item a user gesture corresponds to. Alternatively, the artificial reality environment can supply gesture location information to the browser, which the browser can use to correlate to displayed content items and reply with the corresponding content item identifier.

In some implementations, selecting a content item for manipulation outside the browser can cause the browser to "hide" or otherwise not display the content item, or to display a placeholder content item, until the version outside the browser is closed. This can be accomplished by sending a message to the browser indicating the grab location or which content item has been selected, triggering a process of the browser to hide the content item or otherwise replace it with a placeholder.

At block 508, process 500 can determine whether the content item selected at block 506 is A) not associated with 3D content, B) associated with environment content (e.g., a panoramic image, a panoramic video, a 3D image, or a new artificial reality environment), or C) associated with one or more 3D model(s). If there is an association with 3D content, it can be identified as described above in relation to block 504 e.g., based on HTML tags, content post-fix identifiers, identifiers imbedded in the content items, an analysis of the content itself, or using other tags. If the selected content item is not associated with 3D content, process 500 can take branch "A)" to subprocess 5A (525 shown in FIG. 5 continued-1). In some implementations, when the selected content item is not associated with 3D content, process 500 can generate environment content (e.g., a 3D image) for the selected content item. This will make the selected content item now associated with environment content. If the selected content item was previously or is now associated with environment content, process 500 can take branch "B)" to subprocess 5B (550 shown in FIG. 5 continued-2). If the selected content item is associated with one or more 3D model(s), process 500 can take branch "C)" to subprocess 5C (575 shown in FIG. 5 continued-3).

When the selected content item is not associated with 3D content, process 500 has taken branch "A)" from block 508 to block 528 of process 525. At block 528, process 525 can obtain the selected content item and create a 2D version of it. In cases where block 504 was performed to prefetch content, the 2D version can be already created and in local storage for the artificial reality environment, and process 525 can obtain the 2D version from that local storage. In other implementations, process 525 can have an identifier, including a URL or other address indicating a remote storage location, for the selected content item, which process 525 can retrieve from the remote storage. In some implementations, the browser can supply the selected content item to the artificial reality environment, e.g., via IPC communication. In some implementations, process 525 can create a 2D panel, outside the browser, on which process 525 can display the image. The 2D version of the selected content item can be displayed in the artificial reality environment. For example, the 2D version can be displayed in relation to the gesture identified at block 506. In some implementations where the gesture is a grab and pull, this can appear as if the 2D version is being pulled out of the browser.

At block 530, process 525 can monitor user manipulations of the 2D version of the selected content item. For example, the user may be able to resize, rotate or reposition, deform, or otherwise interact with the 2D version of the content item. The user can also "release" or otherwise exit from the 2D version of the content item. In some implementations this can be accomplished by making a particular gesture, such as opening the user's hand or releasing a button on a controller. In other implementations, the 2D version can be associated with a virtual control, such as an exit button, the activation of which can signify release of the selected content item.

At block 532, if process 525 has not identified release of the selected content item, process 525 can return to block 530 until the release is identified. Once the release is identified, process 525 can continue to block 534.

At block 534, in response to the selected content item being released, process 525 can remove display of the 2D version of the selected content item from the artificial reality environment. This can include deleting it from the local storage for the artificial reality environment or setting it as a hidden object. In some implementations, releasing the selected content item can cause the 2D version to appear to snap or fly back into the browser, e.g., to the location in the browser it was pulled out from, before process 525 hides the 2D version. In some implementations where the selected content item in the browser was hidden or replaced with a placeholder content item, process 525 can signal to the browser to redisplay the selected content item in the browser when the user releases it or after displaying the effect of the 2D version flying back into the browser. Process 525 (and process 500) can then end.

From block 508, when the selected content item is associated with environment content, process 500 has taken branch "B)" from block 508 to block 552 of process 550. At block 552, process 550 can obtain the environment content corresponding to the selected content item and create a partial view into the environment content. In cases where block 504 was performed to prefetch content, the environment content can be already in local storage for the artificial reality environment, and process 550 can obtain the environment content from that local storage. In other implementations, process 550 can have an identifier, including a URL or other address for the environment content, which process 550 can use to retrieve the environment content the remote storage. In some implementations, the browser can supply the environment content, e.g., via IPC communication. In some implementations, process 550 can create a partial view into the environment content as a 2D panel or contoured 2D shape (e.g., a section of an ellipsoid or cylinder), outside the browser. In various implementations, the partial view into the environment content can be shown on the 2D panel or contoured 2D shape as a static image of part of the environment or can be a dynamic "window" that changes views of the environment as the partial view is moved. For example, the partial view can show an image into the environment from a virtual camera in the environment with a camera angle specified by the position of the partial view. Once created, process 550 can display the partial view in the artificial reality environment. For example, the partial view can be displayed in relation to the gesture identified at block 506. In some implementations where the gesture is a grab and pull, this can appear as if the partial view is being pulled out of the browser. At this point the user can both see the browser and can move an manipulate the partial view outside the browser.

At block 554, process 550 can monitor user manipulations of the partial view into the environment content. For example, the user may be able to resize, rotate or reposition, deform, or otherwise interact with the partial view. In some implementations, the user can grip edges or corners of the partial view and manipulate the partial view by changing the position of the edges or corners, e.g., pulling them apart or pushing them together, rotating them, etc. The user can also "release" or otherwise exit from the partial view. In some implementations this can be accomplished by making a particular gesture, such as opening the user's hand or releasing a button on a controller. In other implementations, the partial view can be associated with a virtual control, such as an exit button, the activation of which can signify release of the partial view.

At block 556, if process 550 has not identified release of the partial view, process 550 can continue to block 558. Once the release is identified, process 550 can continue to block 566. At block 558, process 550 can determine whether the manipulations of the partial view have caused it to exceed a threshold. Process 550 can use various thresholds for this determination such as a total size of the partial view, a distance between the partial view and the user's face (which can be "above" a threshold in that the distance has gone below a minimum distance), or an amount of the user's field of view that the partial view takes up. In some implementations, the threshold can be a combination of these or an alternative between them, such as determining the threshold is exceeded if the partial view is larger than two feet (in virtual space) or within 10 inches of the user's face. Examples of the threshold include where the partial view is greater than 18, 24, or 36 inches across a diagonal; is within 6, 10, or 18 inches of the user's face; or takes up more than 30, 50, or 75 percent of the user's field of view. Other threshold values can also be used. If the partial view exceeds the threshold, process 550 can proceed to block 560. Otherwise, process 550 can return to block 554 where it continues to monitor the user manipulations of the partial view.

At block 560, in response to the partial view exceeding the threshold, process 550 can display a new artificial reality environment based on the environment content. For example, where the environment content is a panoramic image or video, process 550 can place the user in the center of an ellipsoid or cylinder on which the entire panoramic image or video is displayed, allowing the user to view different parts of the panoramic video or image by changing her gaze direction. As another example, where the environment content is a 3D image or an entire environment, e.g., a virtual area which can contain virtual objects, process 550 can replace the current environment with the new virtual area, allowing the user to view the new virtual area, e.g. in three or six degrees of freedom. In various implementations, the new artificial reality environment can show the browser or the browser can remain in the previous artificial reality environment. In some implementations, instead of creating a partial view at block 552, process 550 can begin by taking the user immediately into the new artificial reality environment, e.g., proceeding directly from block 508 to block 560 after obtaining the environment content.

At block 562, process 550 can determine whether the user exited the new artificial reality environment. For example, the user may be able to exit the artificial reality environment by performing a particular gesture, pressing a button on a control, activating a virtual control, etc. In some implementations, the user can continue to hold the gesture of gripping the partial view while in the new artificial reality environment and can exit the new artificial reality environment by releasing the partial view. Until the user exits the new artificial reality environment, process 550 can return from block 562 to block 560, where process 550 will continue to display the new artificial reality environment.

Once the user exits the new artificial reality environment, process 550 can proceed to block 564 where it will stop displaying the new artificial reality environment and display the previous artificial reality environment instead. In some implementations, upon exiting the new artificial reality environment, the partial view into the environment content can reappear (e.g., positioned in relation to one or both of the user's hands or one or more controllers), allowing the user to further control and manipulate the partial view. Process 550 can further monitor the manipulations of the partial view by returning to block 554. In an alternate implementation, as shown by dashed line 568, instead of returning to block 554, exiting the new artificial reality environment can also be interpreted as releasing the partial view, and so process 550 continues to block 566.

At block 566, entered either from block 556 or block 564, process 550 can remove display of the partial view from the artificial reality environment. This can include deleting the partial view from the local storage for the artificial reality environment or setting it as a hidden object. In some implementations, prior to removing the partial view from the artificial reality environment, process 550 can cause the partial view to appear to snap or fly back into the browser, e.g., to the location in the browser it was pulled out from. In some implementations where the selected content item in the browser was hidden or replaced with a placeholder content item, process 550 can signal to the browser to redisplay the selected content item in the browser when the user releases the partial view or after displaying the effect of the partial view flying back into the browser. Process 550 (and process 500) can then end.

From block 508, when the selected content item is associated with one or more 3D model(s), process 500 has taken branch "C" from block 508 to block 578 of process 575. At block 578, process 575 can obtain the 3D model(s) corresponding to the selected content item and them to the artificial reality environment. In cases where block 504 was performed to prefetch content, the 3D model(s) can be already in local storage for the artificial reality environment, and process 575 can obtain them from the local storage. In other implementations, process 575 can have an identifier, including a URL or other address for the 3D model(s), which process 575 can retrieve from the remote storage. In some implementations, the browser can supply the 3D model(s), e.g., via IPC communication. Once obtained, process 575 can load the 3D model(s) into the artificial reality environment.

The remainder of process 575 can be performed separately for each of the one or models or for the models as a group. At block 580, process 575 can monitor user manipulations of one of the 3D models. For example, the user may be able to resize, rotate or reposition, deform, activate associated controls, or otherwise perform any interaction available for the 3D model. The user can "release" or otherwise exit the 3D model. In some implementations this can be accomplished by making a particular gesture, such as opening the user's hand or releasing a button on a controller. In other implementations, the 3D model can be associated with a virtual control, such as an exit button, the activation of which can signify release of the 3D model.

At block 582, if process 575 has not identified release of the 3D model, process 575 can return to block 580 until the releases are identified. Once the releases are identified, process 575 can continue to block 584.

At block 584, in response to the 3D model being released, process 575 can remove display of the 3D model from the artificial reality environment. This can include deleting it from the local storage for the artificial reality environment or setting it as a hidden object. In some implementations, releasing the 3D model can cause it to snap or fly back into the browser, e.g., to the location in the browser it was pulled out from, before process 575 hides the 3D model. In some implementations where the selected content item in the browser was hidden or replaced with a placeholder content item, process 575 can signal to the browser to redisplay the selected content item (or the part of the selected content item associated with that model) in the browser when the user releases the 3D model or after displaying the effect of the 3D model flying back into the browser. Process 575 (and process 500) can then end.

Figure 6:
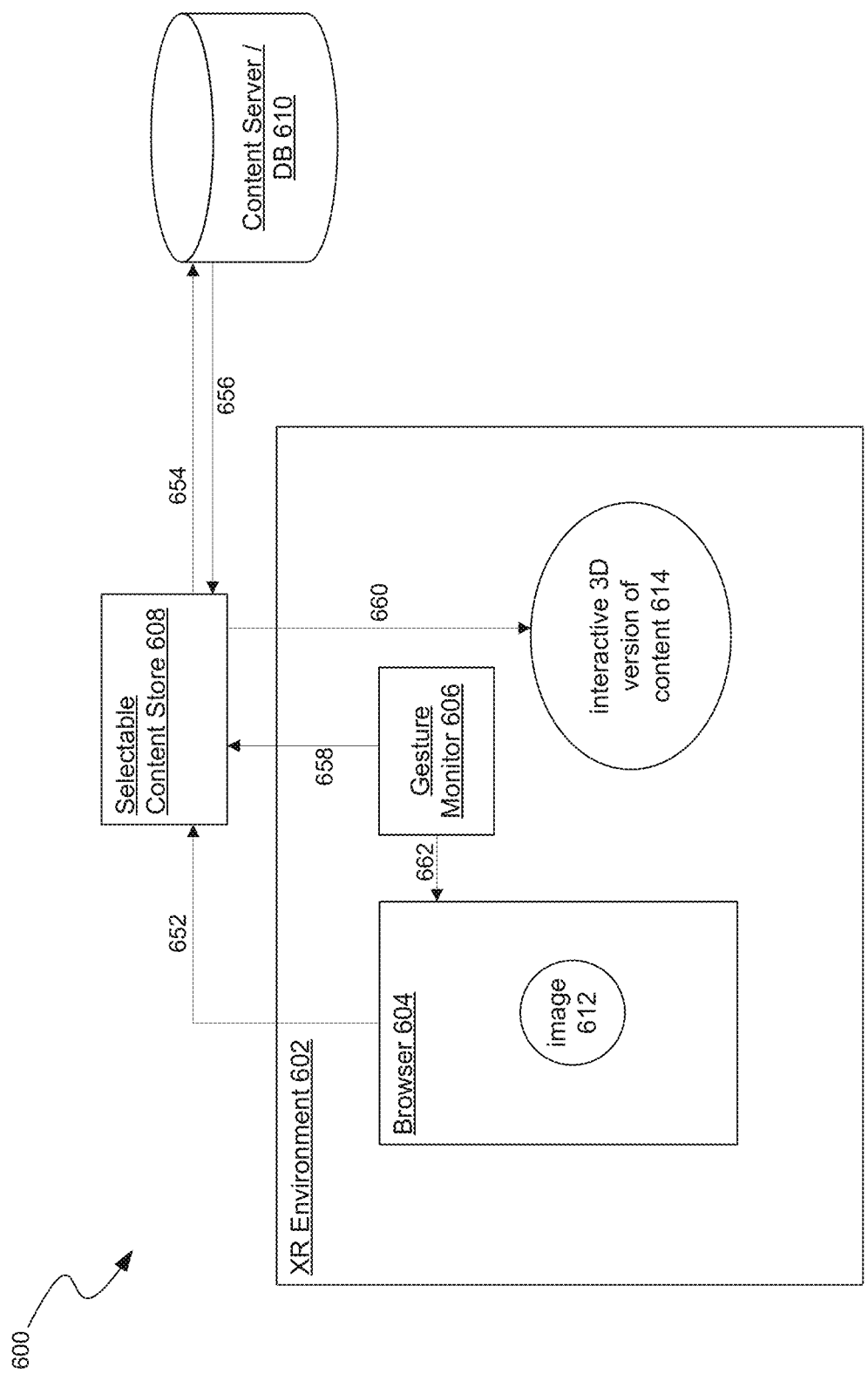
FIG. 6 is a block diagram illustrating components executing a process, used in some implementations of the present technology, for presenting, in an artificial reality environment, an interactive 3D version of a web-based content item.

FIG. 6 is a block diagram illustrating an example 600 of components executing a process used in some implementations of the present technology for presenting a web-based content item in an artificial reality environment. Example 600 includes an artificial reality (XR) environment 602; a web browser 604, with an image 612, displayed in the XR environment 602; a gesture monitor 606; a selectable content store 608; a content server or database (DB) 610; and an interactive 3D version of content 614.

Example 600 begins with the browser 604 displayed in the XR environment 602. The user can operate the browser to view and interact with a displayed website that contains image 612. When the website is loaded, the browser 604, at step 652, sends an IPC message indicating a list of content items, including image 612, in the website. In response to the IPC message, the selectable content store 608 resolves the list of content items into types based on associated tags, and retrieves and stores (e.g., at steps 654 and 656) 3D content corresponding to at least some of the content items for inclusion in a 3D environment. For example, images from the website not otherwise associated with 3D content can be received from the browser or a remote source and converted into 2D versions (e.g., 2D panels) or into 3D images; where a content item is associated with environment content (e.g., panoramic images or videos, 3D images, or environments), the associated environment content can be retrieved; or where a content item is associated with a 3D model, the associated 3D model can be retrieved.

Example 600 can continue with the gesture monitor 606 monitoring user gestures in relation to the browser. When a gesture selects one of the content items that was listed in the IPC message from step 652 (determined, e.g., based on content item position data provided by the browser 604—not shown), example 600 can select, at step 658, the corresponding content that can be displayed in the 3D environment outside the browser, from the selectable content store 608. In this case, the user has "grabbed" the image 612 from within the browser and made a "pull" gesture. In response, the selectable content store 608 can provide the interactive 3D version of content 614, corresponding to the image 612, to the XR environment 602, which displays it in relation to the pull gesture. Thus, to the user, it appears as if she is pulling content out of the browser. Gesture monitor 606 can also provide an indication of the image selection to the browser 604, causing it to replace the image 612 with an empty box until the user releases the interactive 3D version of content 614. At that point, the XR environment can hide the interactive 3D version of content 614 (first showing an effect as if the interactive 3D version of content 614 is snapping back into the browser 604) and signal the browser 604 to replace the empty box with the original image 612.

Figure 7A:
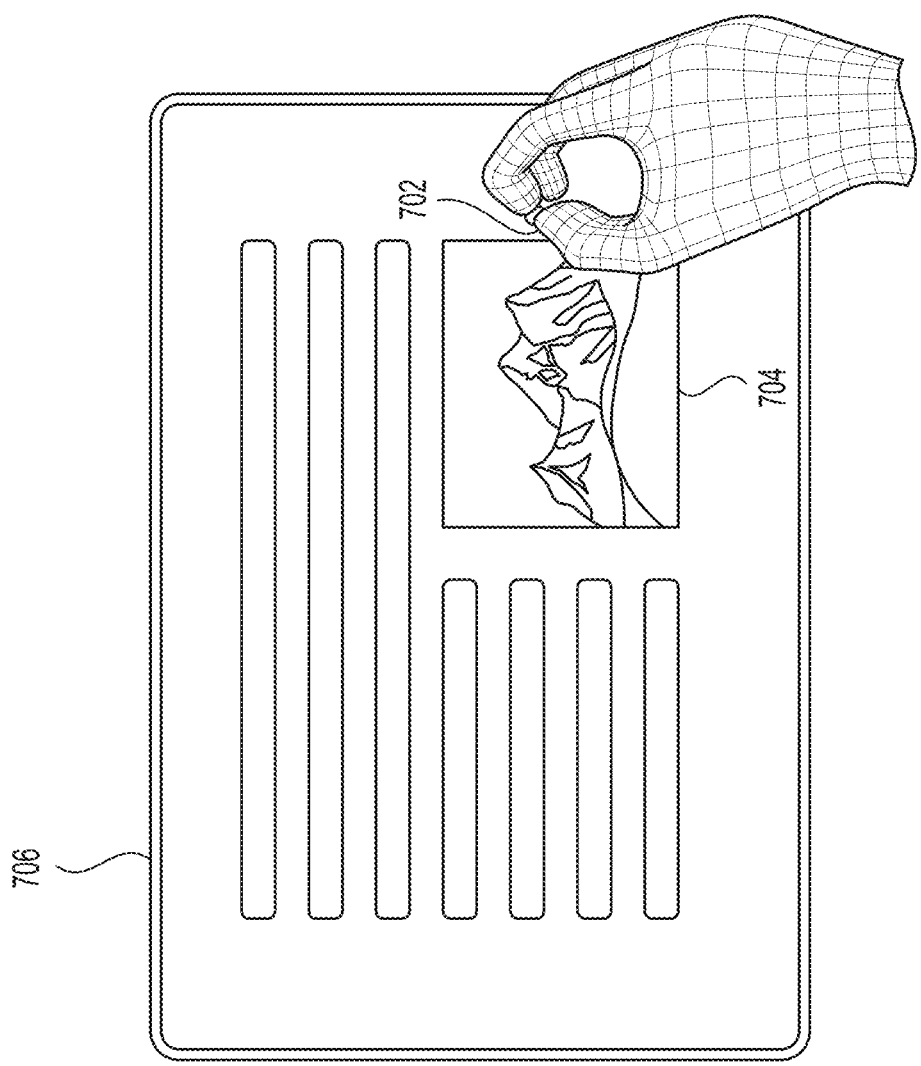
Figure 7C:
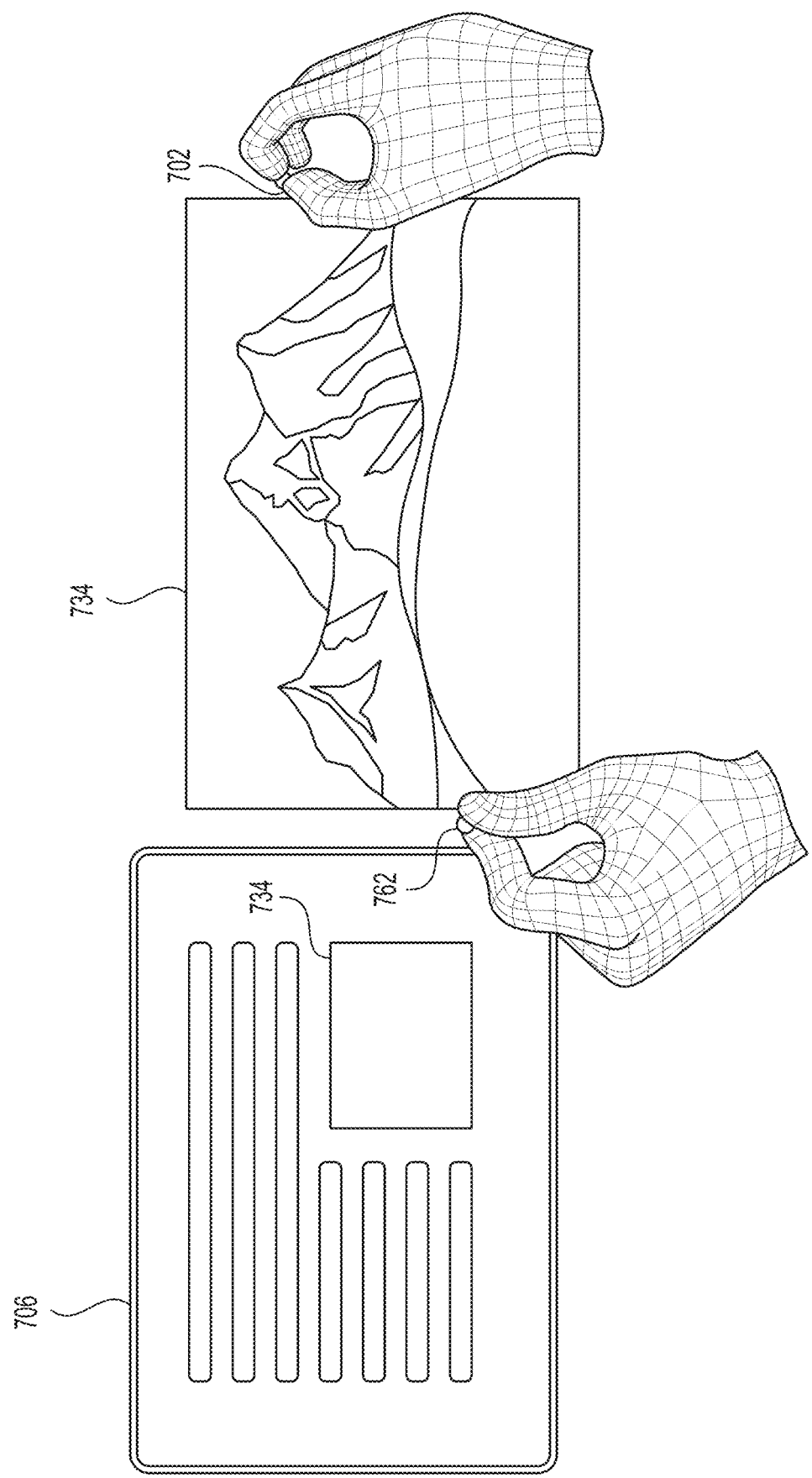

FIGS. 7A-7C are conceptual diagrams illustrating an example interaction with a web-based content item that was not previously associated with 3D content. FIG. 7A, for example, illustrates a gesture 702 of a user reaching into a browser 706 displayed in an artificial reality environment and selecting an image 704 displayed by the browser 706 by grasping near the edge of the image 704. FIG. 7B illustrates a gesture where the user is "pulling" the image out of the browser. The artificial reality environment, in response to this gesture, creates a 2D panel 732 showing the image 704, with the 2D panel attached to the user's hand. The artificial reality environment also messages to the browser 706 to replace the image 704 in the browser 706 with an empty box 734. FIG. 7C illustrates the user performing another gesture 762 to grab another edge of the 2D panel 734 and pull it away from the gesture 702 that is holding the opposite edge of the 2D panel 734, causing the artificial reality environment to enlarge the 2D panel 734.

Figure 8A:
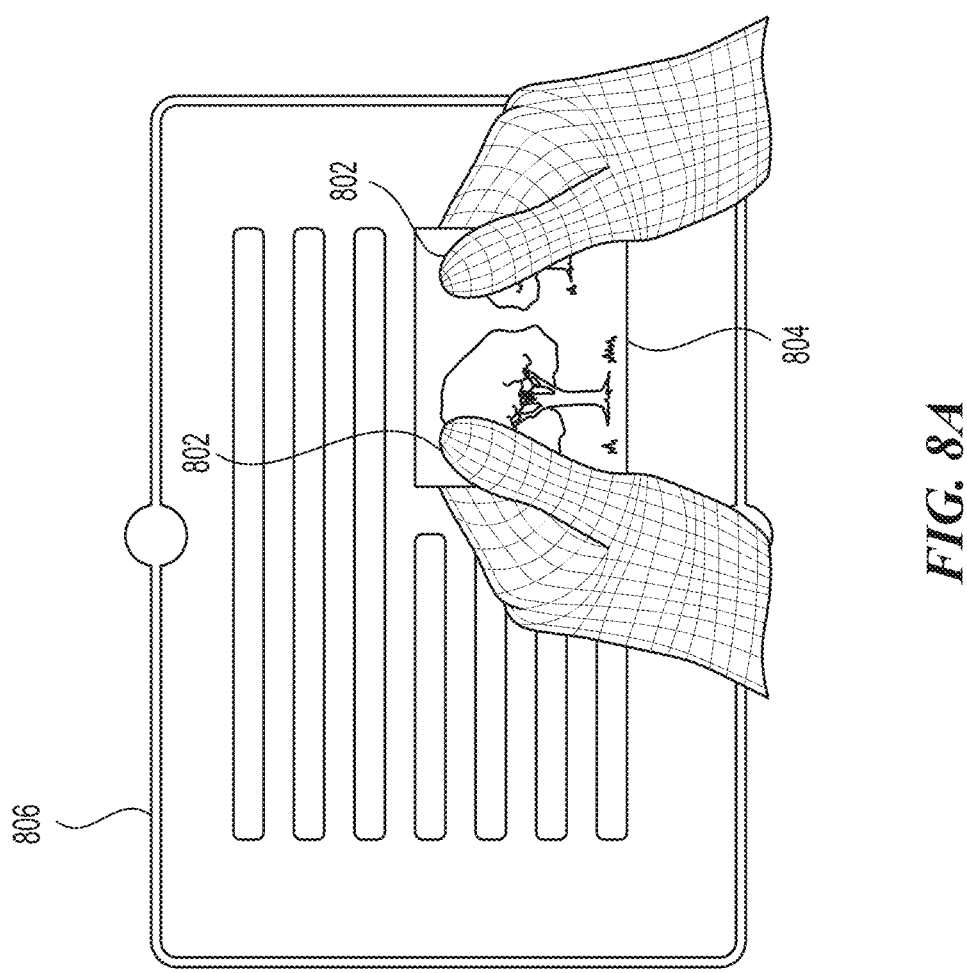
FIGS. 8A-8D are conceptual diagrams illustrating an example interaction with a web-based content item that is associated with 3D content comprising environment content.
Figure 8B:
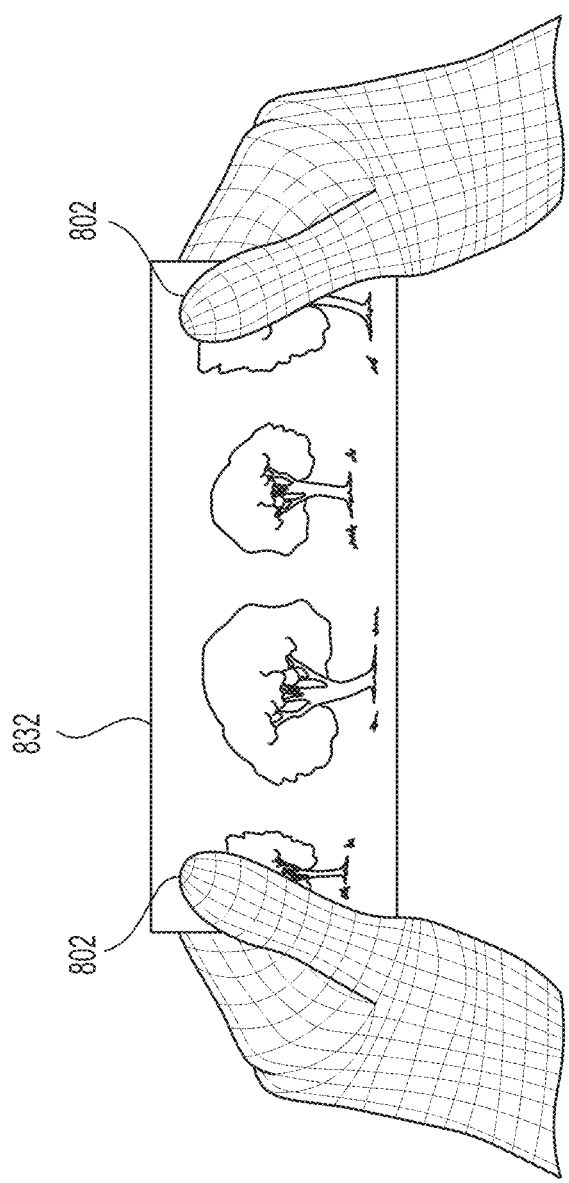
Figure 8C:
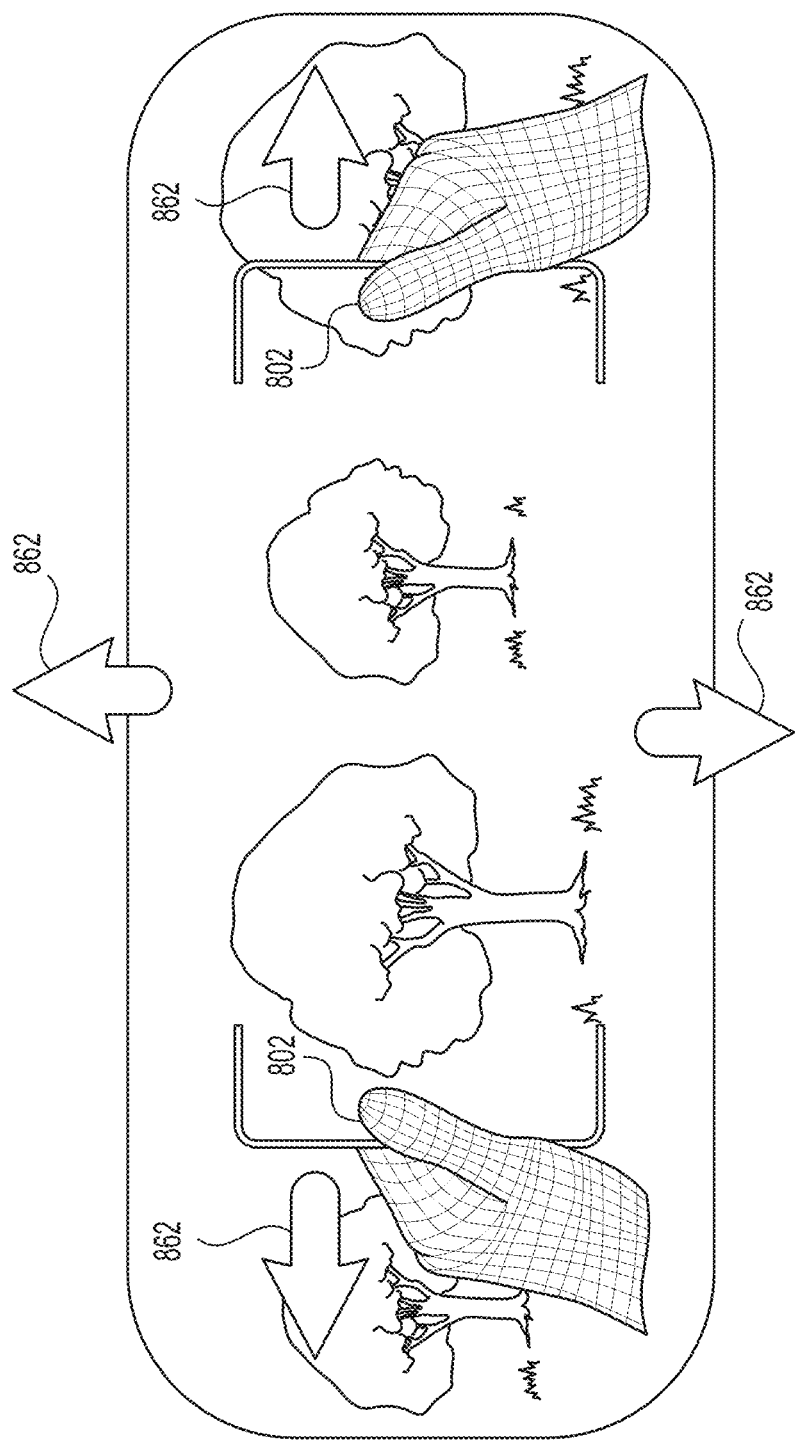
Figure 8D:
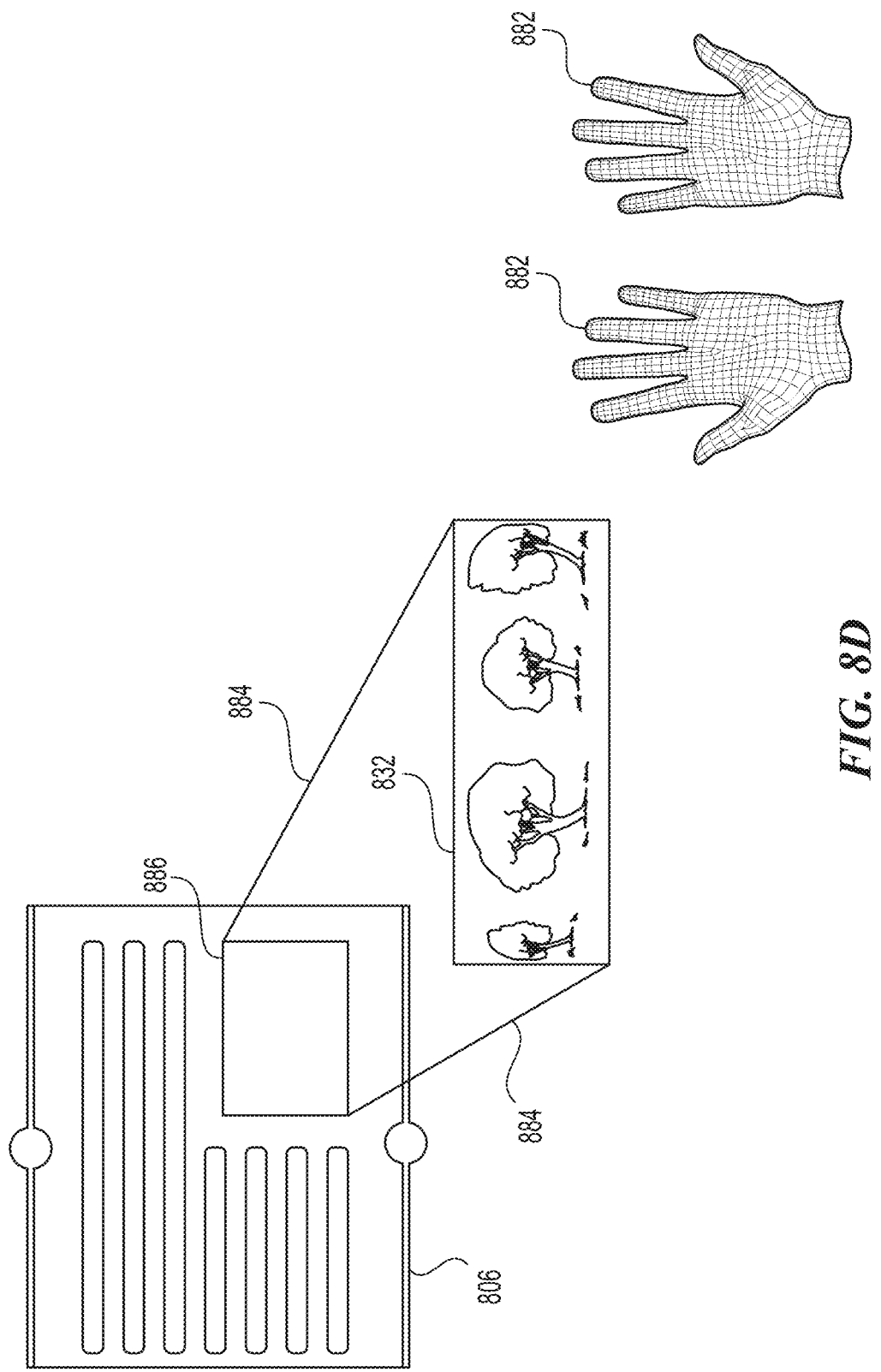

FIGS. 8A-8D are conceptual diagrams illustrating an example interaction with a web-based content item that is associated with 3D content comprising environment content (in this case a panoramic image). FIG. 8A illustrates a two-handed gesture 802 of a user reaching into a browser 806 displayed in an artificial reality environment and selecting an image 804 displayed by the browser 806 by grasping opposite edges of the image 804. FIG. 8B illustrates the user holding a partial view into the environment content 832 associated with image 804, which was created in response to the user pulling the image 804 out of the browser 806 with gesture 802. The user has extended gesture 802 by pulling opposite edges of the partial view apart, enlarging the partial view into the environment 832. At this point, the partial view into the environment 832 is still below a threshold distance away from the user. In this example, the partial view into the environment 832 is a "window" into the panoramic image, so the user can move the partial view into the environment 832 in different directions to view different parts of the panoramic image. FIG. 8C illustrates a point where the user continues to hold gesture 802, but has pulled the partial view into the environment 832 within the threshold distance to herself, causing the partial view into the environment 832 to expand (as indicated by arrows 862) to encompass the entire artificial reality environment. The user is now encompassed in an ellipsoid (e.g., a sphere) on which the entire panoramic image is displayed. The user can move her head in three degrees of freedom to view different parts of the panoramic image without having to move the gesture 802. FIG. 8D illustrates a point where the user has performed a gesture 882 by opened her hands, releasing gesture 802. This causes the artificial reality environment to exit the environment entered in FIG. 8C, return to the environment containing the browser 806, and display an effect (shown by action lines 884) where the partial view into the environment 832 snaps back into the browser 806. The browser 806 can then replace the placeholder box 886 with the original image 804.

Figure 9A:
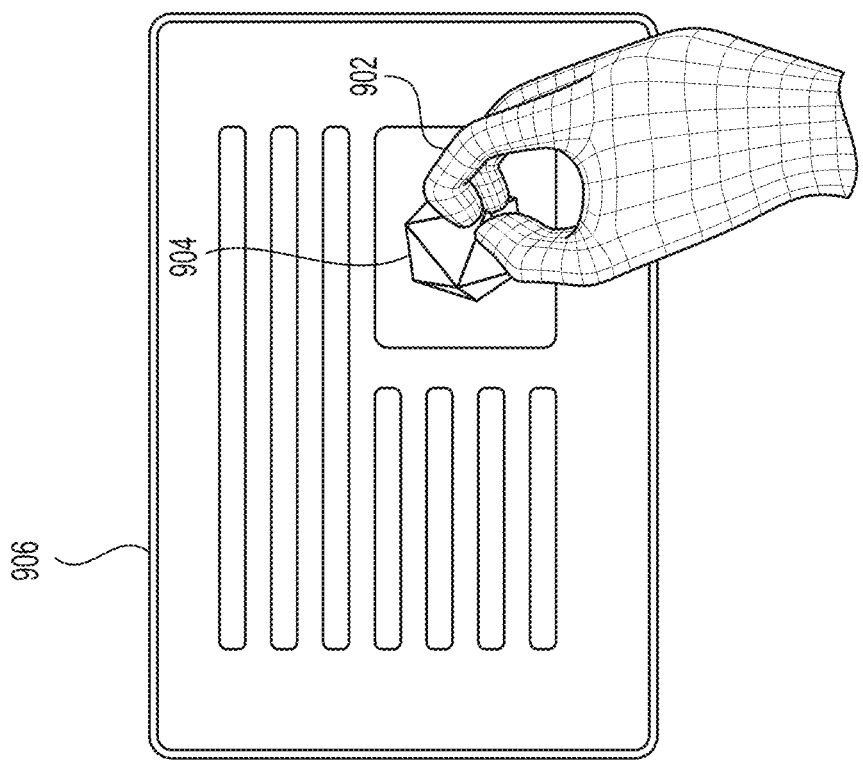
FIGS. 9A-9C are conceptual diagrams illustrating an example interaction with a web-based content item that is associated with 3D content comprising a 3D model.
Figure 9B:
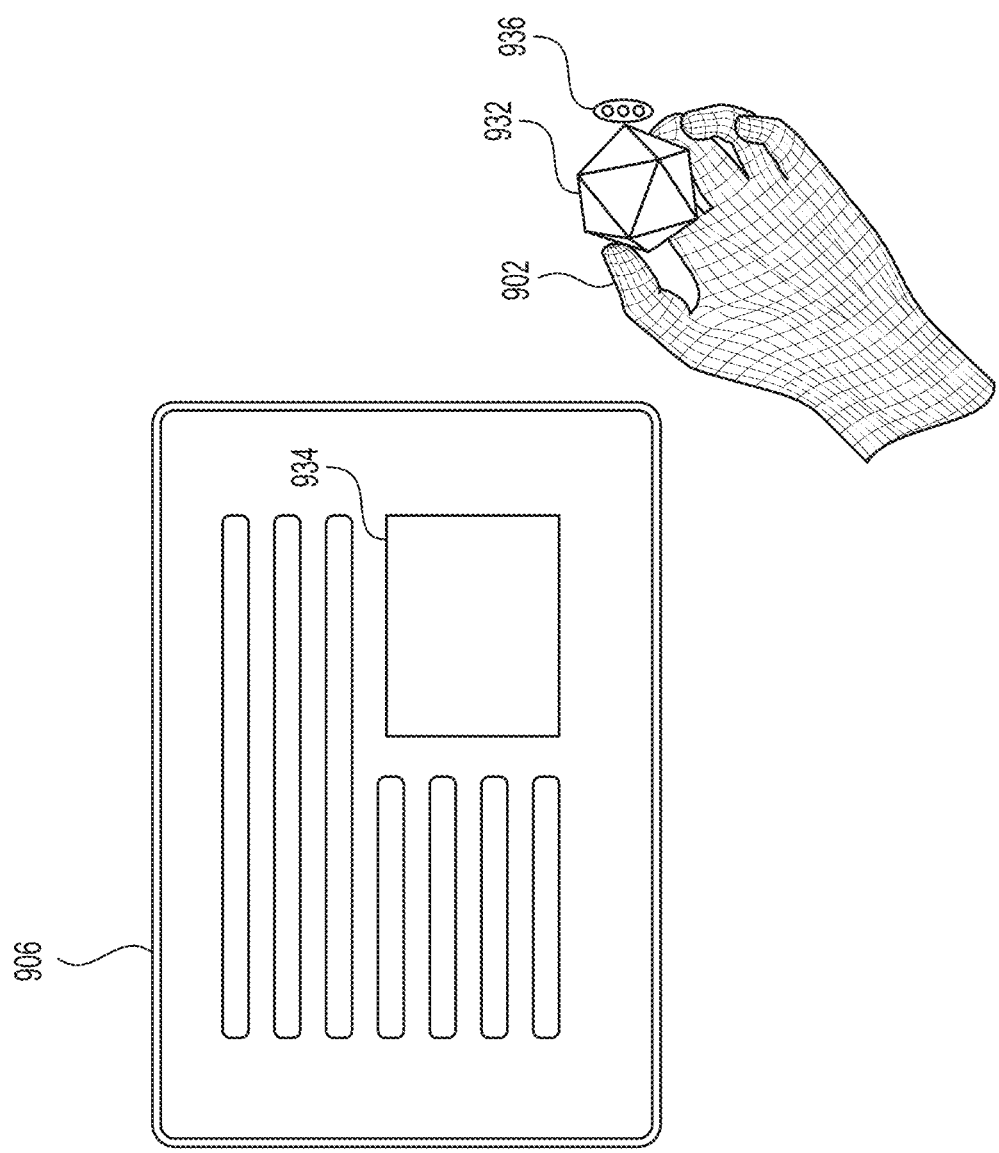
Figure 9C:
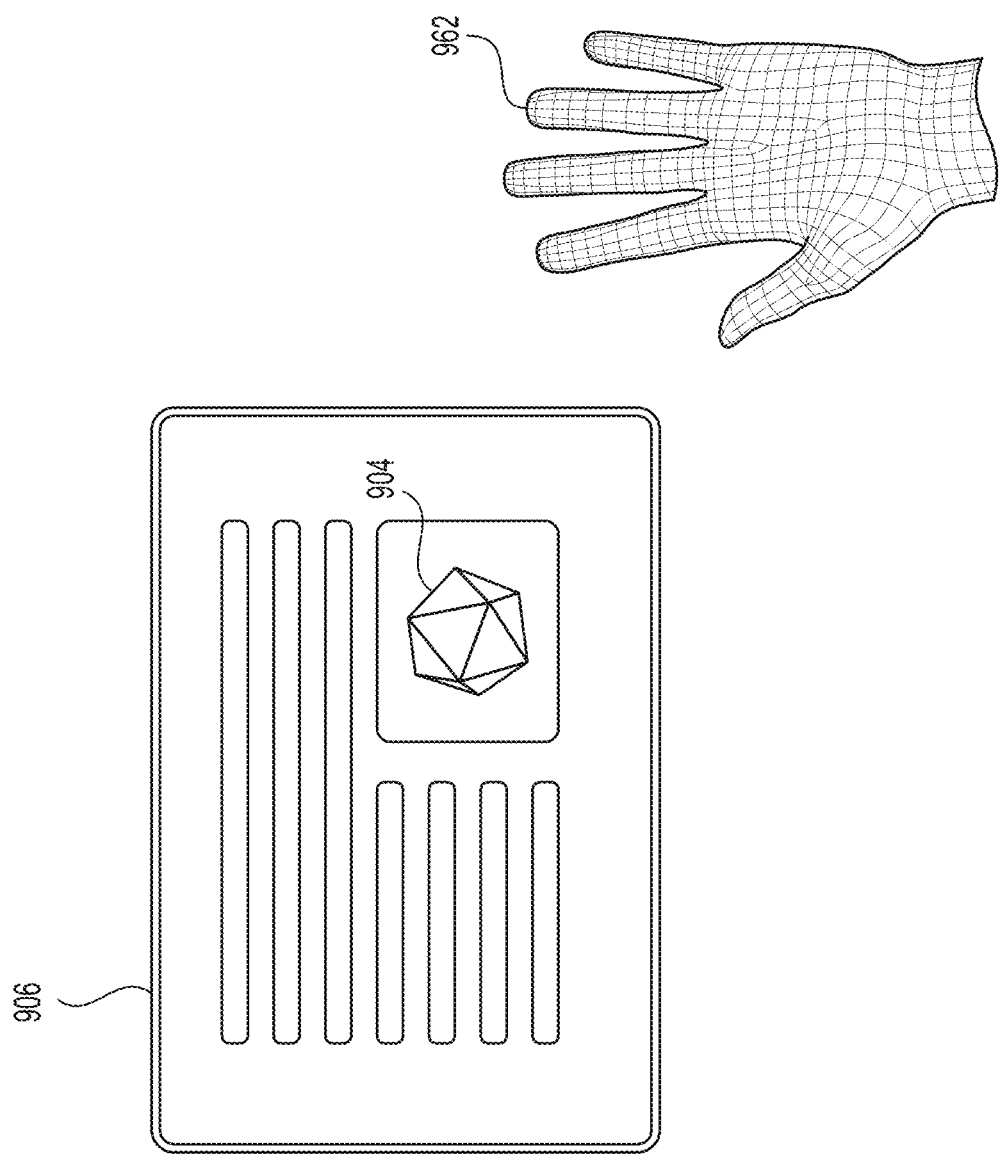

FIGS. 9A-9C are conceptual diagrams illustrating an example interaction with a web-based content item that is associated with 3D content comprising a 3D model. FIG. 9A, for example, illustrates a gesture 902 of a user reaching into a browser 906 displayed in an artificial reality environment and selecting an image 904, displayed by the browser, by grasping part of the image 904. FIG. 9B illustrates the user holding a 3D model 932, associated with image 904, which was created in response to the user pulling the image 904 out of the browser 906 while holding gesture 902. The artificial reality environment also messages to the browser 906 to replace the image 904 in the browser 906 with an empty box 934. The user can now manipulate the model 932 in 3D space, outside the browser 906, e.g., rotating or moving it while holding gesture 902 or activating controls 936 displayed in association with the 3D model 932. FIG. 9C illustrates a point where the user has performed a gesture 962 by opening her hand, releasing gesture 902. This causes the artificial reality environment to cause the 3D model 932 to fly back into the browser 906 and then be hidden and to message the browser 906, indicating that the user has released the 3D model 932. The browser 906 can then replace the placeholder box 934 with the original image 904.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A non-transitory computer-readable storage medium storing instructions that, when executed by a computing system, cause the computing system to perform a process for presenting a web-based content item, the process comprising:
   identifying a user selection corresponding to the web-based content item which is in a browser displayed in a first artificial reality environment;
   determining that the web-based content item is associated with environment content, wherein the environment content is one or more of: A) a panromantic image, B) a panoramic video, C) a new artificial reality environment, D) a 3D image that is a two-dimensional virtual object where what is displayed by the 3D image changes depending on the viewing angle at which that 3D image is viewed, or E) any combination thereof; and
   in response to determining that the web-based content item is associated with the environment content, creating a partial view, into the environment content, that the user can manipulate separate from manipulating the browser, wherein the partial view is a 2D object through which the user can view at least a portion of the panromantic image, panoramic video, new artificial reality environment, 3D image environment content, or combination thereof; and
   in response to user manipulations that cause the partial view, into the environment content, to exceed a threshold, causing a second artificial reality environment, based on the environment content, to be displayed, wherein the causing the second artificial reality environment to be displayed replaces the first artificial reality environment with the second artificial reality environment by providing the user with a field-of-view that is shown from within the panromantic image, panoramic video, new artificial reality environment, 3D image environment content, or combination thereof.

2. The non-transitory computer-readable storage medium of claim 1, wherein the user selection is recognized by determining the user made a two-handed gesture, with each hand performing a gesture on an opposite side, from the other hand, of the web-based content item.

3. The non-transitory computer-readable storage medium of claim 1, wherein the user selection is recognized by determining the user made a motion that A) selects the web-based content item in the browser and B) pulls away from the browser.

4. The non-transitory computer-readable storage medium of claim 1 wherein,
   following identifying the user selection, the web-based content item is not displayed in the browser; and
   following a determination that the user released the partial view, the web-based content item reappears in the browser.

5. The non-transitory computer-readable storage medium of claim 1, wherein the web-based content item is displayed in the browser with an indication that the web-based content item is associated with 3D content.

6. The non-transitory computer-readable storage medium of claim 5, wherein the indication that the web-based content item is associated with 3D content is an effect, added to the web-based content item, displayed when the user interacts with the web-based content item.

7. The non-transitory computer-readable storage medium of claim 1, wherein causing the second artificial reality environment to be displayed allows the user to move around within the second artificial reality environment in six degrees of freedom.

8. The non-transitory computer-readable storage medium of claim 1, wherein the process further comprises receiving a user input to exit the second artificial reality environment and, in response, replacing the second artificial reality environment with the first artificial reality environment.

9. The non-transitory computer-readable storage medium of claim 1, wherein the manipulations that cause the partial view into the environment content to exceed the threshold include manipulations that cause the partial view into the environment content to exceed a size threshold.

10. The non-transitory computer-readable storage medium of claim 1, wherein the manipulations that cause the partial view into the environment content to exceed the threshold include manipulations that cause the partial view into the environment content to exceed a threshold amount of a user's field of view.

11. The non-transitory computer-readable storage medium of claim 1, wherein the user selection is recognized by determining the user made a first user gesture and wherein the process further comprises:
   identifying a second user gesture to release the partial view into the environment content;
   displaying, in the first artificial reality environment, an effect in which the partial view moves toward the browser; and
   causing the partial view into the environment content to not be displayed in the first artificial reality environment.

12. A method for presenting a web-based content item, the method comprising:
   identifying a user selection corresponding to the web-based content item which is in a browser displayed in a first artificial reality environment;

determining that the web-based content item is associated with environment content, wherein the environment content is one or more of: A) a panromantic image, B) a panoramic video, C) a new artificial reality environment, D) a 3D image that is a two-dimensional virtual object where what is displayed by the 3D image changes depending on the viewing angle at which that 3D image is viewed, or E) any combination thereof; and in response to determining that the web-based content item is associated with the environment content, creating a partial view, into the environment content, that the user can manipulate separate from manipulating the browser, wherein the partial view is a 2D object through which the user can view at least a portion of the panromantic image, panoramic video, new artificial reality environment, 3D image environment content, or combination thereof; and in response to user manipulations that cause the partial view, into the environment content, to exceed a threshold, causing a second artificial reality environment, based on the environment content, to be displayed, wherein the causing the second artificial reality environment to be displayed replaces the first artificial reality environment with the second artificial reality environment by providing the user with a field-of-view that is shown from within the panromantic image, panoramic video, new artificial reality environment, 3D image environment content, or combination thereof.

13. The method of claim 12, wherein the user manipulations in relation to the partial view include one or more of moving the partial view in six degrees of freedom, resizing the partial view, and warping the partial view.

14. The method of claim 12, further comprising creating the environment content, associated with the web-based content item, which is a 2D image, by converting a version of the 2D image into a 3D image.

15. The method of claim 12, further comprising:
identifying a user gesture to release the partial view;
displaying, in the first artificial reality environment, an effect in which the partial view moves toward the browser; and
causing the partial view to not be displayed.

16. A computing system for presenting a web-based content item, the computing system comprising:
one or more processors; and
a memory storing instructions that, when executed by the one or more processors, cause the computing system to perform a process comprising:
identifying a user selection corresponding to the web-based content item which is in a browser displayed in a first artificial reality environment;

determining that the web-based content item is associated with environment content, wherein the environment content is one or more of: A) a panromantic image, B) a panoramic video, C) a new artificial reality environment, D) a 3D image that is a two-dimensional virtual object where what is displayed by the 3D image changes depending on the viewing angle at which that 3D image is viewed, or E) any combination thereof; and in response to determining that the web-based content item is associated with the environment content, creating a partial view, into the environment content, that the user can manipulate separate from manipulating the browser, wherein the partial view is a 2D object through which the user can view at least a portion of the panromantic image, panoramic video, new artificial reality environment, 3D image environment content, or combination thereof; and in response to user manipulations that cause the partial view, into the environment content, to exceed a threshold, causing a second artificial reality environment, based on the environment content, to be displayed, wherein the causing the second artificial reality environment to be displayed replaces the first artificial reality environment with the second artificial reality environment by providing the user with a field-of-view that is shown from within the panromantic image, panoramic video, new artificial reality environment, 3D image environment content, or combination thereof.

17. The system of claim 16, wherein the process further comprises, in response to a website containing the web-based content item being loaded by the browser, buffering or caching the environment content associated with the web-based content item in local storage.

18. The system of claim 16, wherein the user selection is recognized by determining the user made a motion that A) selects the web-based content item in the browser and B) pulls away from the browser.

19. The system of claim 16, wherein the process further comprises receiving a user input to exit the second artificial reality environment and, in response, replacing the second artificial reality environment with the first artificial reality environment.

20. The system of claim of claim 16, wherein causing the second artificial reality environment to be displayed allows the user to move around within the second artificial reality environment in six degrees of freedom.

* * * * *